(12) United States Patent
Hua et al.

(10) Patent No.: US 11,885,968 B2
(45) Date of Patent: Jan. 30, 2024

(54) PUPIL MATCHED OCCLUSION-CAPABLE OPTICAL SEE-THROUGH HEAD-MOUNTED DISPLAY

(71) Applicant: Arizona Board of Regents on Behalf of the University of Arizona, Tucson, AZ (US)

(72) Inventors: Hong Hua, Tucson, AZ (US); Austin Wilson, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 17/642,623

(22) PCT Filed: Sep. 14, 2020

(86) PCT No.: PCT/US2020/050693
§ 371 (c)(1),
(2) Date: Mar. 11, 2022

(87) PCT Pub. No.: WO2021/051068
PCT Pub. Date: Mar. 18, 2021

(65) Prior Publication Data
US 2022/0350146 A1 Nov. 3, 2022

Related U.S. Application Data

(60) Provisional application No. 62/900,204, filed on Sep. 13, 2019.

(51) Int. Cl.
*G02B 27/01* (2006.01)
*G02B 13/22* (2006.01)
(Continued)

(52) U.S. Cl.
CPC ......... *G02B 27/0172* (2013.01); *G02B 13/22* (2013.01); *G02B 27/0093* (2013.01);
(Continued)

(58) Field of Classification Search
CPC ............ G02B 27/0093; G02B 27/0172; G02B 27/1026; G02B 13/22; G02B 2027/0134;
(Continued)

(56) References Cited

U.S. PATENT DOCUMENTS 7,639,208 B1 12/2009 Ha et al.
2014/0361957 A1* 12/2014 Hua .................. G02B 27/0172
345/8

(Continued)

FOREIGN PATENT DOCUMENTS

AU     2017201669 A1 *  3/2017 ............. G02B 13/06
WO    2018165119 A1     9/2018
(Continued)

OTHER PUBLICATIONS

Cakmakci, O., et al., "A compact optical see-through head-worn display with occlusion support," Proceedings of the Third IEEE and ACM International Symposium on Mixed and Augmented Reality (ISMAR), pp. 16-25, (2004).
(Continued)

*Primary Examiner* — Jwalant Amin
(74) *Attorney, Agent, or Firm* — Perkins Coie LLP

(57) ABSTRACT

Compact occlusion-capable optical see-through head mounted displays (OCOST-HMDs) are described having a double-wrapped path and capable of rendering per-pixel mutual occlusion, and correct see-through viewing perspective or a pupil-matched viewing between the virtual and real views. An example device includes a polarizer, a polarizing beam splitter, an objective lens, a spatial light modulator (SLM), an eyepiece lens, a quarter wave plate, and a
(Continued)

reflective optical element configured to reflect the light that is incident thereupon in a first direction, and to transit the light received from a microdisplay that is incident thereupon from a second direction. The components form a first double-pass configurations that allow the light that passes through the objective to reflect from the SLM and propagate again through the objective, and a second double-pass configuration that allows the light that passes through the eyepiece to reflect from the reflective optical element and propagate again through the eyepiece.

19 Claims, 14 Drawing Sheets

(51) Int. Cl.
    *G02B 27/00*     (2006.01)
    *G02B 27/10*     (2006.01)
    *G06T 19/00*     (2011.01)

(52) U.S. Cl.
    CPC ........ *G02B 27/1026* (2013.01); *G06T 19/006* (2013.01); *G02B 2027/0138* (2013.01)

(58) Field of Classification Search
    CPC .......... G02B 2027/0138; G02B 25/001; G06T 19/006
    See application file for complete search history.

(56) References Cited

U.S. PATENT DOCUMENTS

| | | | |
|---|---|---|---|
| 2017/0256095 | A1 | 9/2017 | Bani-hashemi |
| 2018/0024373 | A1 | 1/2018 | Joseph et al. |
| 2018/0292655 | A1 | 10/2018 | Smithwick et al. |
| 2019/0171005 | A1 | 6/2019 | Lee et al. |
| 2020/0371356 | A1* | 11/2020 | Khan ................ G02B 27/0172 |

FOREIGN PATENT DOCUMENTS

| | | |
|---|---|---|
| WO | 2019135165 A2 | 7/2019 |
| WO | 2019173158 A1 | 9/2019 |

OTHER PUBLICATIONS

Gao, C., et al., "Occlusion capable optical see-through head-mounted display using freeform optics," IEEE International Symposium on Mixed and Augmented Reality (ISMAR), pp. 281-282, (2012).

Gao, C., et al., "Optical see-through head-mounted display with occlusion capability," Proc. of SPIE 8735, 87350F, (2013).

Howlett, Isela D. and Smithwick, Quinn, (2017), 46-4: Distinguished Student Paper: Perspective Correct Occlusion-Capable Augmented Reality Displays using Cloaking Optics Constraints, SID Symposium Digest of Technical Papers, 48.

Hua, H., et al., "A testbed for precise registration, natural occlusion and interaction in an aug mented environment using a head-mounted projective display (HMPD)," Proceedings IEEE Virtual Reality, Orlando, FL, pp. 81-89. (2002).

International Search Report and Written Opinion dated Dec. 9, 2020 for International Patent Application No. PCT/US2020/050693.

Itoh, Yuta, et al., "Light Attenuation Display: Subtractive See-Through Near-Eye Display via Spatial Color Filtering," IEEE Transactions on Visualization and Computer Graphics, vol. 25, No. 5, 2019.

Kiyokawa, K., et al., "An Optical See-through Display for Mutual Occlusion with a Real-time Stereo Vision System" Elsevier Computer & Graphics Special Issue on "Mixed Realities—Beyond Conventions" 25(5):2765-779, (2001).

Kiyokawa, K., et al., "An occlusion capable optical see-through head mount display for supporting co-located collaboration," Proceedings of The Second IEEE and ACM International Symposium on Mixed and Augmented Reality, pp. 1-9, 2003.

Maimone, A., et al., "Computational augmented reality eyeglasses," Proc. of 2013 IEEE International Symposium on Mixed and Augmented Reality (ISMAR), pp. 29-38, (2013).

Tatham, E., "Getting the best of both real and virtual worlds," Communications of the ACM, 42(9): 96-98, (1999).

Wetzstein, G., et al., "Tensor Displays: Compressive light field synthesis using multilayer displays with directional backlighting," Proc. ACM SIGGRAPH (ACM Transaction on Graphics), 31(4), (2012).

Wilson, A., et al., "Demonstration of an occlusion-capable optical see-through head-mounted display", SID symposium digest of technical paper, 48(1). 2017.

Wilson, Austin, et al., "Design and demonstration of a vari-focal optical see-through head-mounted display using freeform Alvarez lenses," Optics Express, vol. 27, No. 11, 2019.

Wilson, Austin, et al., "Design and prototype of an augmented reality display with per-pixel mutual occlusion capability," Optics Express, vol. 25, No. 24, 2017.

Cakmakci, Owen, et al., "A Compact Optical See-Through Head-Worn Display with Occlusion Support", Proceedings of the Third IEEE and Acm International Symposium On Mixed & Augmented Reality, 2004, pp. 16-25.

Extended European Search Report dated Oct. 25, 2023 for European Patent Application No. 20864004.5.

* cited by examiner

PUPIL MATCHED OCCLUSION-CAPABLE OPTICAL SEE-THROUGH HEAD-MOUNTED DISPLAY

CROSS REFERENCE TO RELATED APPLICATION(S)

This patent document is a 371 National Phase Application of International Patent Application No. PCT/US2020/050693, filed Sep. 14, 2020, which claims priority to the provisional application with Ser. No. 62/900,204, titled "Pupil Matched Occlusion-Capable Optical See-Through Head-Mounted Display," filed Sep. 13, 2019. The entire contents of the above noted applications are incorporated by reference as part of the disclosure of this document

TECHNICAL FIELD

The technology in this document generally relates to head-mounted displays and specifically to head-mounted displays with a wide field of view.

BACKGROUND

A see-through head-mounted display (HMD) is one of the key enabling technologies for merging digital information with a physical scene in an augmented reality system. While both video see-through and optical see-through displays have their unique advantages, optical see-through HMDs (OST-HMD) tend to be preferred when it comes to real scene resolution, viewpoint disparity, field of view (FOV) and image latency. Conventional optical see-through head-mounted displays typically rely on an optical combiner such as beamsplitter or a diffractive grating to uniformly combine the light of the real world with that of virtual objects. Aside from additional expense, additional weight, additional alignment considerations and increased footprint of the prior systems, the FOV of the conventional systems is limited by the see-through objective optics, which is typically narrow.

SUMMARY

The techniques disclosed herein can be implemented in various embodiments to achieve an optical architecture for a compact occlusion-capable OCOST-HMD design, which among other features and benefits, includes a wide FOV that is not limited by the objective optics. The disclosed methods, systems and devices utilize a double-wrapped path and offer an OCOST-HMD that is capable of rendering per-pixel mutual occlusion, correct see-through viewing perspective or a pupil-matched viewing between virtual and real views, and a very wide see-through FOV.

One aspect of the disclosed embodiments relates to an occlusion-capable optical see-through head-mount display (OCOST-HMD) that includes a polarization element configured to receive light from a real scene and to produce polarized light at the output thereof, a polarizing beam splitter (PBS), an objective lens, a spatial light modulator (SLM), an eyepiece lens, a quarter wave plate (QWP), and a reflective optical element configured to reflect substantially all or a portion of light that is incident thereupon in a first direction, and to transit substantially all or a portion of light received from a microdisplay that is incident thereupon from a second direction. The SLM and the objective lens form a first double-pass configuration that allows at least a portion of light that passes through the objective lens to be reflected from the SLM and to propagate again through the objective lens. The eyepiece lens and the reflective optical element form a second double-pass configuration that allows at least a portion of light that passes through the eyepiece lens to be reflected from the reflective optical element and to propagate again through the eyepiece lens.

BRIEF DESCRIPTION OF THE DRAWINGS

FIG. 4C illustrates MTF plots for the see-through path of an example OCOST-HMD system in accordance with the disclosed embodiments.

DETAILED DESCRIPTION

Figure 1A:
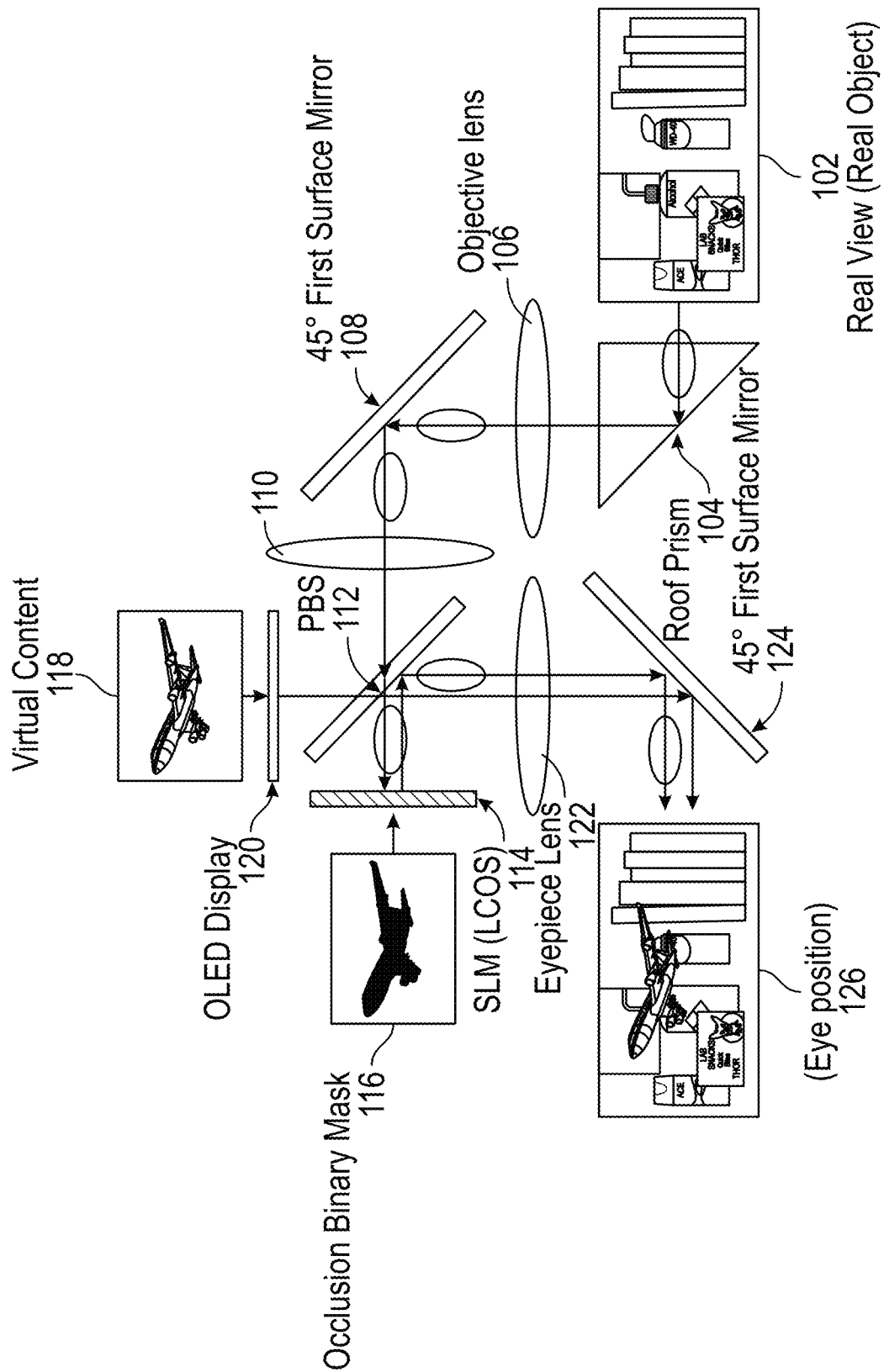
FIG. 1A illustrates the schematic diagram of a previously proposed two-layer folded OCOST-HMD optical design.

The disclosed embodiments relate to novel optical architectures for a compact occlusion-capable optical see-through head mounted display (OCOST-HMD), which among other features and benefits, uses an optical architecture with a double-wrapped path and offers an OCOST-HMD solution that is capable of rendering per-pixel mutual occlusion, correct see-through viewing perspective or a pupil matched viewing between virtual and real views, and a very wide see-through field of view (FOV). Detailed example implantations and an example prototype system are described for illustration purposes. The prototype offers a virtual display FOV greater than 40 degree diagonally and a resolution of 1920×1200 pixels, with an optical performance of greater than 20% modulation contrast over the full FOV. Further, a wide see-through FOV of 90° by 40° with an angular resolution of 1.0 arc minutes comparable to a 20/20 vision can be achieved.

Developing OST-HMDs presents many technical challenges, one of which lies in the challenge of correctly rendering light blocking behaviors between digital and physical objects in space, otherwise known as mutual occlusion. Occlusion in augmented reality displays is a powerful depth cue; without it, severe misjudgments such as wrong color registration, degraded image contrast and object placement disparity can occur. In order to have correct mutual occlusion relationships, an opaque virtual object in the foreground should appear to be solid and occlude real objects located in the background and vice versa. When intermixing virtual and real objects, an opaque virtual object should appear to be fully opaque and occlude a real object located behind it and a real object should naturally occlude the view of a virtual object located behind the real one. Accordingly, there are two types of occlusion: that of real-scene objects occluding virtual ones, and of virtual objects occluding the real scene. The occlusion of a virtual object by a real object can often be achieved in a straight-forward fashion, for example, by simply not rendering the virtual object where the occluding real object sits, when the location of the real object relative to the virtual scene is known. Thus, in this case, occlusion of a virtual object by a real object can be done simply by not rendering the known digitally overlapped area of the virtual object that is occluded by the virtual object. The occlusion of a real object by a virtual one, however, presents a much more complicated problem because it requires the blocking of light in the real scene.

In the last decade, a few OCOST-HMD concepts have been proposed, with even fewer designs being prototyped. The existing methods for implementing OCOST-HMDs fall into two types: direct ray blocking and per-pixel modulation. The direct ray blocking method selectively blocks the rays from the see-through scene without focusing them. It can be implemented by selectively modifying the reflective properties of physical objects or by passing the light from the real scene through a single or multiple layers of spatial light modulators (SLMs) placed directly near the eye. For instance, in some prior systems, creating natural occlusion of virtual objects by physical ones via a head-mounted projection display (HMPD) device have been investigated using retroreflective screens onto non-occlusion physical objects, which can only be used in limited setups. In some prior systems, the occlusion function through a transmissive SLM directly placed near the eye with no imaging optics has been investigated. The direct ray blocking method via an SLM would be a straightforward and adequate solution if the eye were a pinhole aperture allowing a single ray from each real-world point to reach the retina. Instead, the eye has an area aperture, which makes it practically impossible to block all the rays seen by the eye from an object without blocking the rays from other surrounding objects using a single-layer SLM.

Some prior systems include a lensless computational multi-layer OST-HMD design which consists of a pair of stacked transmissive SLMs, a thin and transparent backlight, and a high-speed optical shutter. Multiple occlusion patterns can be generated using a multi-layer computational light field method so that the occlusion light field of the see-through view can be rendered properly. Although the multi-layer light field rendering method can in theory overcome some of the limitations of a single-layer ray blocking method, it is subject to several major limitations such as the significantly degraded see-through view, limited accuracy of the occlusion mask, and the low light efficiency. The unfavorable results can be attributed to the lack of imaging optics, low light efficiency of the SLMs, and most importantly the severe diffraction artifacts caused by the fine pixels of the SLMs located at a close distance to the eye pupil.

Figure 2:
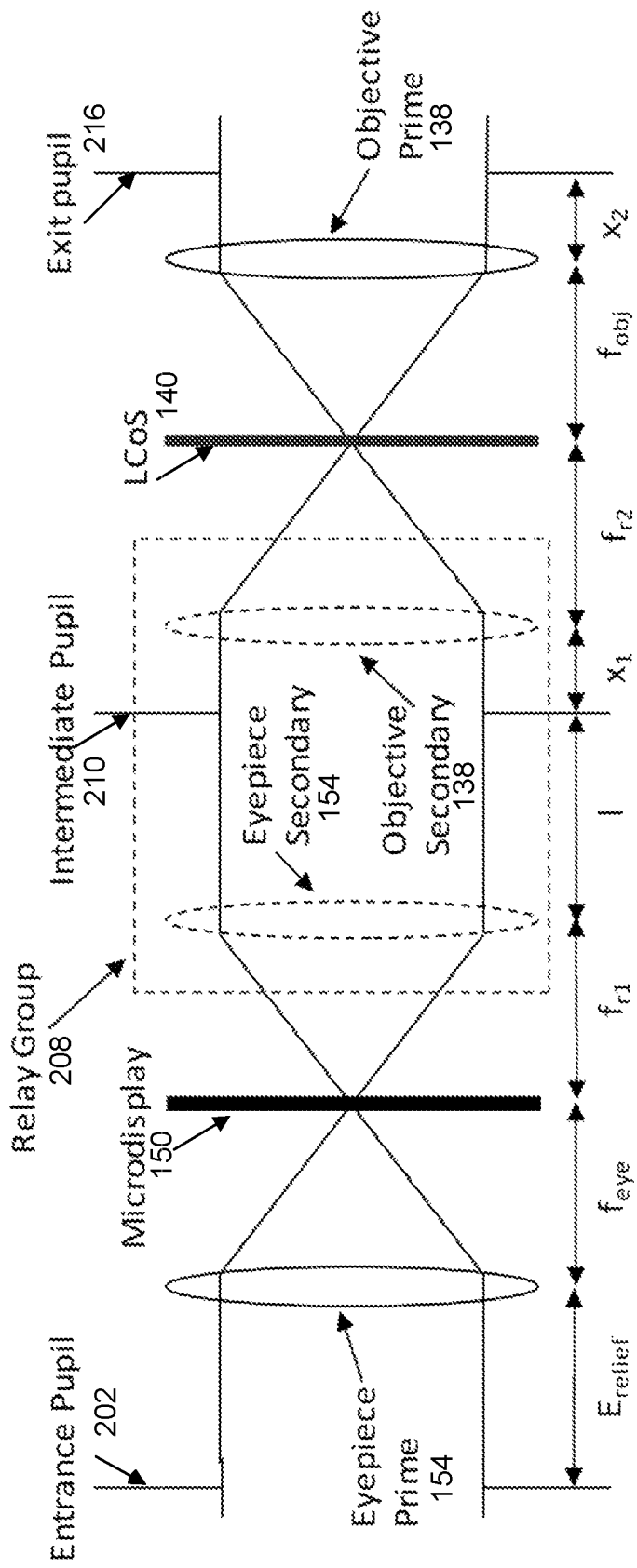
FIG. 2 illustrates an unfolded layout of a portion of the optical elements of the example OCOST-HMD system of FIG. 1B.

The disclosed embodiments can be classified as a per-pixel occlusion method (the embodiment of FIG. 2 falls into this category); as shown in FIG. 2, a focused image of the see-through view is formed at a modulation plane where an SLM is inserted and renders occlusion masks to selectively block the real-world scene point by point. One prior per-pixel modulation method includes a prototype of the ELMO series developed in the early 2000s. The ELMO-4 prototype consists of 4 lenses, 2 prisms and 3 optical mirrors, forming a two afocal 4f relays, arranged in a ring structure to present a pupil matched, upright occlusion capable view of the real scene. Pupil matched, otherwise known as perspective correct, occlusion is the mapping of the user's pupil or relayed pupil back to the user's eye position so that correct view point disparity can be maintained. Limited by the microdisplay and SLM technologies at that time, the ELMO prototypes have fairly low resolutions for both the see-through and virtual display paths, both of which used a 1.5-inch QVGA (320×240) transmissive LCD module. This ring structure has been further recreated utilizing a 3D printed housing with a modern transmission LCD and microdisplay. However, this ring-like folding architecture presents a very bulky package blocking most of the user's face. Additionally, utilizing a transmissive liquid crystal display (LCD) as the SLM when coupled with a beamsplitter offers extremely low light efficiency (<20%).

Some systems have attempted to overcome these limitations by proposing a x-cube prism that utilizes polarization-based optics combined with a reflective SLM for the coupling of the two optical paths to achieve a more compact form factor and high light efficiency. Although this design seemed like a promising solution to the OST-HMD occlusion problem, the solution failed to erect the see-through horizontal view, resulting in an incorrect perspective. Another system proposed a complex two-layer folded optical system using prisms and a reflective SLM to create a compact high resolution OCOST-HMD. With the utilization of a reflective liquid crystal on silicon (LCoS) device as the SLM, the system allowed for a high luminance throughput and high optical resolution for both virtual and see-through paths. The optical design and preliminary experiments demonstrated some potential for a desirable form factor and high optical performances. Based on this same two-layer folding optics architecture, some systems have been designed and built to provide a high resolution OCOST-HMD working prototype using off-the-shelf optical components. The prototype, capable of rendering per-pixel mutual occlusion, utilizes an OLED microdisplay for the virtual display path coupled with a reflective LCoS as the SLM for the see-through path to achieve an occlusion capable OST-HMD offering a 30-degree diagonal FOV and 1920×1080 pixel resolution. However, the two-layer folded optics architecture fails to offer a matched pupil or correct viewing perspective, as the pupil is relayed in front of the user's eye. Additionally, like the original ring-like architecture, the see-through FOV of the two-layer folded architecture is limited to whatever FOV affordable by the see-through objective optics, and thus typically is narrow. This becomes a significant limit to many applications where being to access a much wider peripheral field of view is critical.

Accordingly, the state-of-the-art OST-HMDs lack the ability to selectively block out the light of the real world from reaching the eye. As a result, the digitally rendered virtual objects viewed through OST-HMDs typically appear "ghost-like" (or semi-transparent), always floating "in front of" the real world. FIG. 7A provides one illustrative example of such a ghost-like condition.

The disclosed embodiments provide optical systems based on per-pixel modulation that, among other features and benefits, helps overcome the above noted limitations of the current, state-of-the-art OCOST-HMD systems. The disclosed embodiments achieve this goal, at least in-part, by utilizing a double-pass optical architecture for a compact, high-resolution OCOST-HMD system.

The implementations of the disclosed embodiments include OCOST-HMD systems that include three overlaid optical paths, respectively referred to as: the display path, the SLM path and the see-through path. The disclosed optical architectures offer an OCOST-HMD solution that is capable of rendering per-pixel mutual occlusion, correct see-through viewing perspective or a pupil matched viewing between virtual and real views, and a very wide see-through field of view.

It should be noted that in different embodiments, the central portion of the see-through FOV may be occlusion-enabled to create a wide peripheral vision. Based on the disclosed optical design architectures and custom optimization of the optical systems, we have experimentally demonstrated a wearable, stereoscopic prototype system that utilizes an OLED microdisplay for the virtual display path coupled with a reflective LCoS as the SLM for the see-through path optical mask. It should be further noted that OLED is one example of a microdisplay used in the construction of the prototype and other display technologies may be implemented based on the disclosed embodiments. The prototype offers a virtual display FOV greater than 40 degree diagonally and a resolution of 1920×1200 pixels, with an optical performance of greater than 20% modulation contrast over the full FOV. Further, the system is capable of a wide see-through FOV of 90° by 40° with an angular resolution of 1.0 arc minutes comparable to a 20/20 vision. The prototype has a total weight of about 300 grams and volumetric dimensions of 140 mm (H) 130 mm (W) 25 mm (D), capable of achieving greater than 100:1 dynamic range in well-lighted surroundings. The optical performance of an OST-HMD is further compared with and without occlusion to demonstrate the virtual content contrast fallout of non-occlusion devises in bright environments. It should be noted that the disclosed protype is provided for the purposes of illustration of an example implementation of an OCOST-HMD system in accordance with the disclosed embodiments.

Figure 1B:
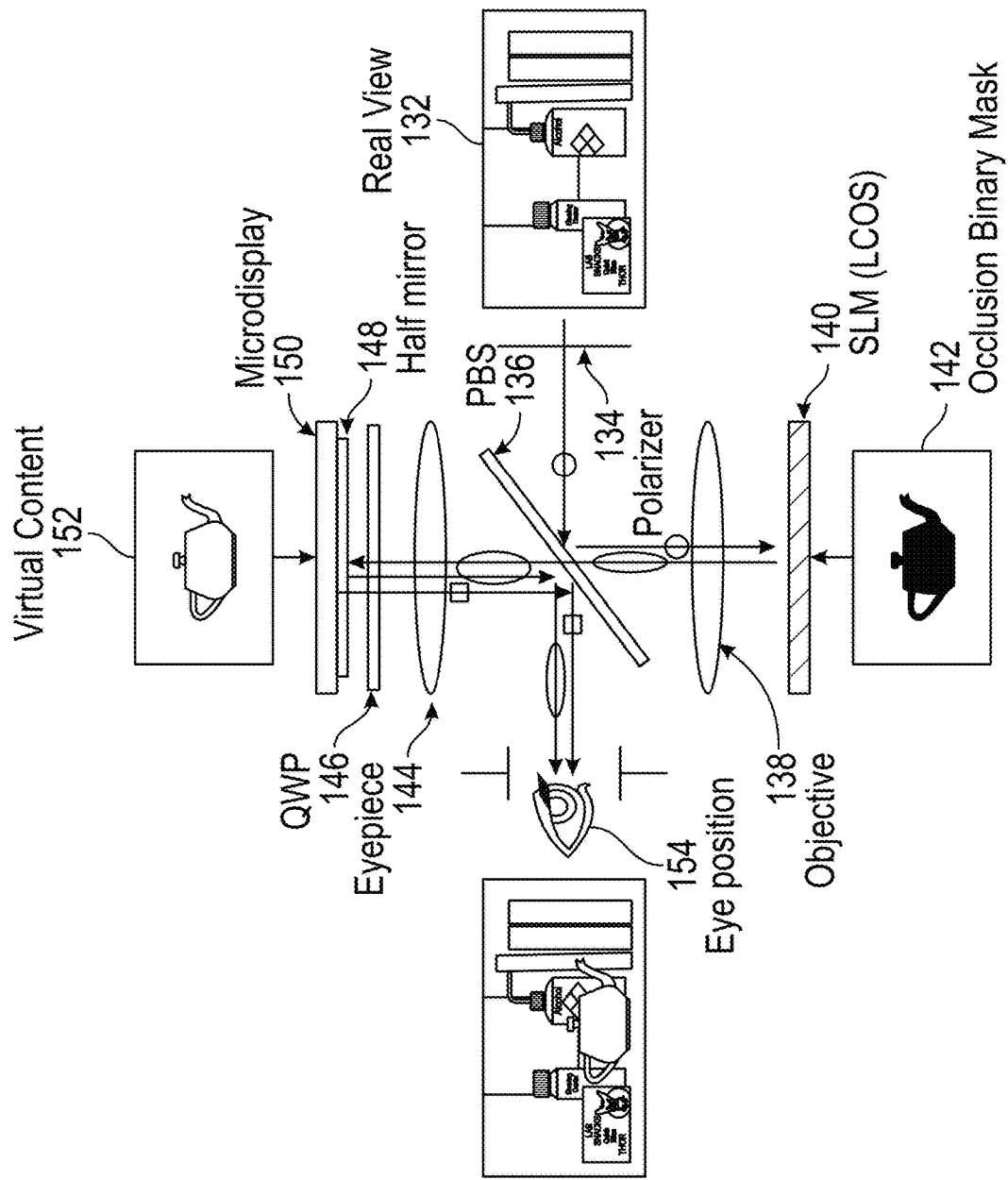
FIG. 1B illustrates a schematic diagram of a single-layer OCOST-HMD optical system in accordance with an example embodiment.

FIG. 1A illustrates the schematic diagram of a previously proposed two-layer folded OCOST-HMD optical design; FIG. 1B illustrates an OCOST-HMD optical system in accordance with an example embodiment of the disclosed embodiments. The system in FIG. 1B is part of a double-pass, single-layer architecture that provides a pupil-matched OCOST-HMD design.

In the system of FIG. 1A, two folding mirrors 108, 124, a roof prism 104 and a PBS 112 are used to fold the optical paths into a two-layer optical architecture. The system of FIG. 1A can be more simply broken down into two mechanisms (the objective 106 and eyepiece 122) to form the basis of a Keplerian telescope. Further the light through the system can be categorized into two distinct components: the virtual display and the real-world view. The light path for the real-world view is shown with ovals surrounding the arrows, while the light path for the virtual display does not include arrows and consists of the path from the OLED display 120, to the first 45-degree surface mirror 108 and to the eyepiece 122. The simplified architecture show in FIG. 1A presents a series of design constraints and optical issues.

First, placing the folded objective path in front of the eyepiece 122 as a second layer while utilizing all glass stock lenses 106, 110 increases the optical form factor by twice the thickness, which leads to a comparatively bulky and heavy system design. Next, polarizing beam splitter (PBS) 112 combines the light paths of the modulated real view 102 and virtual view associated with the virtual content 118 together so that the same eyepiece 122 module is shared for viewing the virtual display and the modulated real-world view (the combination image is viewed at the eye position 126). Since the system is built like a simple telescope, this causes the virtual display and the real-world view path to be coupled as 1:1 conjugates to ensure a unit magnification of the real scene, forcing the optical mask 116 and display 120 to share the same optical requirements. However, this creates a problem because the SLM 114 and microdisplay 120 are often implemented using different technologies and do not share the same technical specifications creating mismatches in optical performance. Another limitation of this arrangement is that the see-through FOV is limited to the FOV being imaged by the telescope system, resulting in a tunnel-vision for the see-through path, which is undesirable for augmented reality (AR) systems. Additionally, the configuration of FIG. 1A can be thought of as a single afocal 4f system. Much like a telescope, this single afocal 4f design causes for the conjugate pupil to be shifted to the other side of the optical relay resulting in an incorrect view point offset. This incorrect viewing perspective results in objects to appear closer than they actually are, thus creating depth disparity between the object hand and eye. Furthermore, the inclusion of the roof prism 104 to produce an upright image adds to the cost/size/weight of the system.

FIG. 1B illustrates the schematic diagram of a single-layer OCOST-HMD optical system in accordance with an example embodiment. The system uses a PBS 136, an objective lens group 138 (which can include one or more lenses) and eyepiece lens group 144 (which can include one or more lenses), which also form two relay lens groups due to the second pass through the objective 138 and eyepiece 144, as further illustrated in FIG. 2. As evident from FIG. 1B, this configuration provides a compact form factor due to the small number of components and the associated folded paths, and enables per-pixel occlusion capability. This double-pass system allows for a single optical layer and, compared to the configuration of FIG. 1A, forgoes the use of heavy optics, such as the first surface mirrors and the roof prism, to create a greatly reduced form factor along with a light weight wearable HMD design. The term single-layer can be further understood by considering that when a viewer of the OCOST-HMD looks through the eyepiece 144, the viewer only receives light from a single layer or set of optics in the system of FIG. 1B, whereas in FIG. 1A, the viewer would receive light from two sets of optical components, one from each of the real-world view and the virtual content.

The description of FIG. 1B is facilitated by splitting the light paths into three light paths: the display path (squares), the SLM path (ovals) and the see-through path (circles). The single PBS 136 acts as both folding elements and combiner to merge the light paths of the modulated real view 132 (see-through and SLM path) and virtual view from the virtual content 152 (display path) together so that the same eyepiece 144 and relay module is shared for viewing the virtual display and the modulated real-world view. Unlike the configuration of FIG. 1A, the double pass architecture of FIG. 1B utilizes a relay to allow for the decoupling of the SLM path and the display path by allowing the objective 138 and eyepiece 144 to have different focal length parameters, no longer needing to be 1:1 conjugates, to achieve a unit magnification of the real scene while maintaining a unit magnification for the overall system. This decoupling of the different optical paths allows for element path to be designed specifically to the different display technologies.

Each of the three paths in FIG. 1B, the display path, the SLM path and the see-through path, provides its own optical performance. Light from the see-through path, identified with circles, passes through a retarder (e.g., a polarizer 134). In this example configuration, the retarder causes the light to be polarized in the S orientation. The S-polarized light is reflected off the PBS 136. An objective lens 138 (or lens group) then collects the light from the physical environment and forms an intermediate image at its focal plane where an amplitude-based reflective SLM (e.g., LCoS) 140 is placed. The SLM 140 can manipulate the polarization orientation to render an occlusion mask 142 for controlling the opaqueness of the real view. For example, the SLM 140 can produce an on-off modulation scheme, in which the light incident on the SLM 140 is selectively reflected (SLM is off) or allowed to be transmitted therethrough on a pixel-by-pixel basis. Other examples modulation schemes can also be implemented.

In the above-noted example, light reflected off the SLM/LCoS 140 is flipped to the P orientation in the SLM path (circles), is then passed back through the same objective lens 138, passes through the PBS 136, and passes through the eyepiece lens 144, forming an optical relay. Light is then transferred through a quarter wave plate (QWP) 146 (or is otherwise retarded) to produce light having a right hand circular (RHC) polarization direction that is incident on a half mirror 148. The half mirror 148 is one non-limiting example of a reflecting surface that allows reflection of substantially all or a portion of the light that is incident thereon from a first direction (e.g., upward traveling light in the example configuration of FIG. 1B) to be reflected back, while allowing substantially all or a portion of the light that is incident thereon from a second direction (e.g., in the configuration of FIG. 1B, the light traveling downward from the microdisplay 150—e.g., OLED) to pass therethrough. Such an element can, for example, be designed as a multi-layer thin-film stack as part of the microdisplay, or as a standalone component.

Upon reflection from the "half mirror" 148, the RHC polarization is flipped to left hand circular (LHC) polarization; the LHC light then passes back though the QWP 146 and eyepiece 144, where the light is translated back to S-polarized light, which is then reflected by the PBS 136 into the user's eye at the eye position 154. In the display path (squares), unpolarized light from the OLED display 150 is imaged by the shared eyepiece 144, where S-polarized light is coupled into the user's eye by the PBS 136 to give three high resolution overlaid images: the optical mask 142, the real scene 132, and the virtual scene 152. Instead of using a roof prism, as implemented in FIG. 1A, an even number in parity switches ensures that the see-through image in the configuration of FIG. 1B is upright and erect, which is critical for an OCOST-HMD system since it cannot be digitally altered.

Figure 1C:
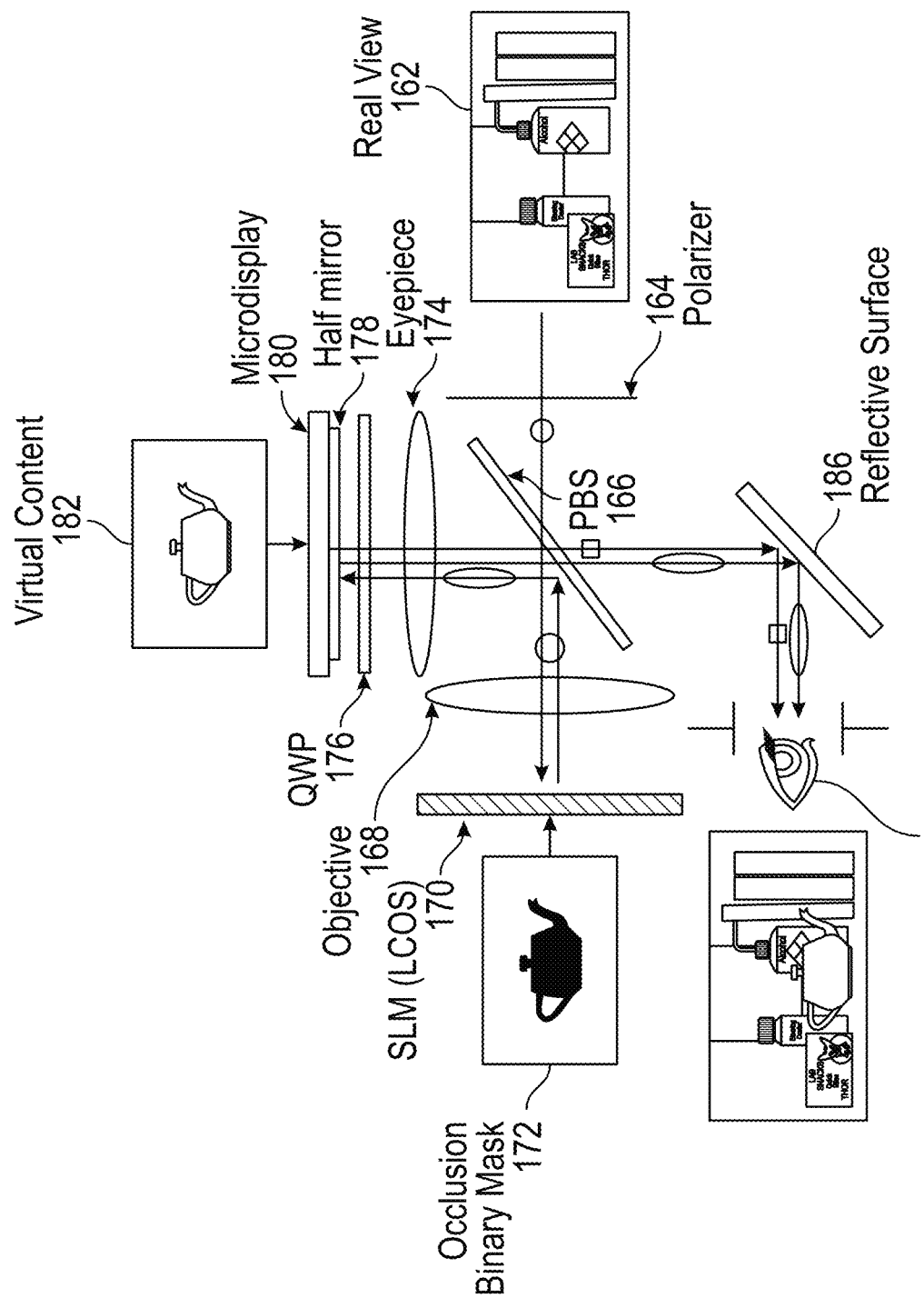
FIG. 1C illustrates another configuration of the a single-layer OCOST-HMD optical system in accordance with an example embodiment.

FIG. 1C illustrates another configuration of the a single-layer OCOST-HMD optical system in accordance with an example embodiment. FIG. 1C has similar components as the configuration in FIG. 1B for combining the real view 162 and the virtual content 182, except that the polarizer 164 modifies the light from the real scene 162 to produce a P-polarized light that passes through the PBS 166 and is incident on the SLM 170 that implements the mask 188 based on the desired modulation. Accordingly, the positions of some components are rearranged compared to FIG. 1B to provide a single-layer configuration. The configuration of FIG. 1C provides similar features and benefits as the configuration of FIG. 1B in providing the combined view at the eye position 188 after reflection from the reflective surface 186.

It should be noted that while FIGS. 1B and 1C illustrate that the QWP 146, 176 is positioned between the eyepiece 144, 174 and the microdisplay 150, 180 (or between the between the eyepiece 144, 174 and the half mirror 148, 178). However, the QWP 146, 176 can be positioned at either side of the eyepiece lens 144, 174. Therefore, in some embodiments, the QWP 146, 176 is positioned between the PBS 136, 166 and the eyepiece 144, 174.

Contrary to a two-layer design, the disclosed double-pass, single-layer architecture allows for the optical path to be correctly pupil-matched. In order to correctly determine the pupil location, we can look at the optical system as a set of two afocal 4f relays that image the entrance pupil to a conjugate intermediate pupil location. FIG. 2 shows the unfolded layout of the optical elements in an example OCOST-HMD system of FIG. 1B (only the unfolded paths are illustrated in FIG. 2). It can be seen that the first afocal relay (on the left) includes the eyepiece lens (labeled as eyepiece prime 154) as well as a first system relay lens (left lens in the relay group 208, labeled as eyepiece secondary 154), which is the eyepiece itself (light passing through the eyepiece is reflected from the OLED (microdisplay 150) and passes through the eyepiece (eyepiece secondary 154) a second time, as shown in the top part of FIG. 1B). The second afocal relay in FIG. 2 includes a second system relay lens (right lens in the relay group, objective secondary 138) and the objective lens (objective prime 138); the second system relay lens is the same as the objective (light passing through the objective is reflected from the LCoS 140 and passes through the objective a second time, as shown in the bottom part of FIG. 1B). FIG. 2 further illustrates the positions of the entrance pupil 202, the intermediate pupil 210 and the exit pupil 216.

The improvement in achievable FOV can be observed by comparing the configuration of FIG. 1A, where the FOV is limited by the FOV of the objective lens, with the configuration of FIG. 1B, where the FOV can be greatly increased. In particular, the see-through FOV can become essentially unlimited in the horizontal direction (i.e., the direction into the paper) and is only limited by the extent of the eyepiece and objective (or the size of beam splitter). The enhancement of FOV in the horizontal direction can be beneficially used to provide improved peripheral viewing ability for the OCOST-HMD system.

Due to the choice of a reflective LCoS SLM, the example configuration of FIG. 1B requires image-space telecentricity for the SLM path to achieve a high contrast. Therefore, the distance of the intermediate pupil xl to the objective lens must be equal to the focal length of the objective lens ($f_{obj}$). Knowing that we have a double pass system, we can assume that fobj and the second relay lens focal length ($f_{r2}$) sharing the same optics are equal allowing the systems exit pupil to be relayed back onto itself. We can then calculate the position of the intermediate pupil in relation to the system focal lengths and the entrance pupil to be Equation (1).

$$l = \frac{f_{r1} f_{eye}^2 + f_{eye} f_{r1}^2 - f_{r1}^2 E_{relief}}{f_{eye}^2}, \quad (1)$$

where $f_{eye}$ and $f_{r1}$ are the respective focal lengths of the eyepiece and first relay lens, $E_{relief}$ is the eye relief, and l is the distance to the intermediate pupil after the first relay lens. Again, since the system utilizes a double optical pass, we can set $f_{eye}$ equal to $f_{r1}$ to get a greatly reduced Equation (2).

$$l = 2f_{eye} + E_{relief} \quad (2).$$

In order for the system to be properly pupil matched, the distance after the first lens group must be equal to the eye relief (ER) of the system, $l = E_{relief}$. This relationship then demonstrates to achieve proper pupil matching and correct viewing perspective by $E_{relief} = f_{eye}$ or in other words the display path must be telecentric, as well. We can then determine the needed principle plane ($P_p$) location in order to get the proper eye clearance ($E_{clearance}$) based on the half FOV ($\theta_{half}$) to be Equation (3).

$$P_p = E_{clearance} - f_{eye} + 2(f_{eye} \tan(\theta_{half}) + \tfrac{1}{2} D_{ep}) \quad (3),$$

where $D_{ep}$ is the diameter of the entrance pupil.

Example Prototype Design: Based on the optical layout in FIG. 1B and the analytical relationships described in Equations (1)-(3) above, an example custom prototype system was designed. The key specifications of the prototype system are summarized in Table 1 below.

TABLE 1

Specifications of an Example System

| Parameters | Specification |
|---|---|
| System Specifications | |
| Display FOV | ~34°(H)*22(V) |
| See-through FOV | ~90°(H)*50°(V) |
| EPD | 10 mm |
| Distortion | <10 Display path, ~0% See-through path |
| Eye clearance | 20 mm |
| Relay | 1:1.22 relay magnification |
| Eyepiece Specifications | |
| Microdisplay type | Emagin WUXGA ® 0.85" OLED panel, 9.6 um pixel pitch, 1920(H)*1200(V) pixels |
| Wavelengths | B: 465 nm G: 550 nm R: 615 nm |
| MTF | >0.2 at 52 cyl/mm for the full FOV |
| Focal length | 29.8 mm |
| Objective Specifications | |
| SLM type | Canon ® 0.7" LCoS panel, 10.7 um pixel pitch, 1400(H)*1050(V) pixels |
| MTF | >0.2 at 47 cyl/mm for the full FOV |
| Focal length | 24.4 mm |

One of the key parameters driving the example design is the choice of display technologies. We chose a 0.85" Emagin OLED microdisplay for the virtual display path. The eMagin OLED, having an effective area of 18.4 mm and 11.5 mm and an aspect ratio of 8:5, offers pixel size of 9.6 µm at a native resolution of 1920×1200 pixels. Based on this microdisplay, we aimed to achieve an OCOST-HMD prototype with a diagonal FOV of >40°, or 34° horizontally and 22° vertically, and an angular resolution of 1.06 arcmins per pixel, corresponding to a Nyquist frequency of 53 cycles/mm in the microdisplay space or 28.6 cycles/degree in the visual space. Separately, for the SLM path, we used a 0.7" reflective LCoS from a projector. A reflective SLM was chosen for its substantial advantage in light efficiency, contrast and low diffraction artifacts, commonly found in a light transmitting SLM used in previous works.

The selected LCoS offers a native resolution of 1400× 1050 pixels, a pixel pitch of 10.7 µm, and an aspect ratio of 4:3. Based on the different display specifications of the SLM, we aimed to achieve an optical mask diagonal FOV of >42.5°, or 34° horizontally and 25.5° vertically, and an angular resolution of 1.45 arcmins per pixel, corresponding to a Nyquist frequency of 47 cycles/mm in the SLM space or 19.66 cycles/degree in the visual space. Further, our system requires an objective focal length of 24.4 mm and an eyepiece focal length of 29.8 mm giving a relay magnification of 1:1.22. To allow eye rotation of about ±25° within the eye socket without causing vignetting, we set an exit pupil diameter (EPD) of 10 mm. An eye clearance distance of 20 mm was used to allow a fit for most head shapes.

Figure 3:
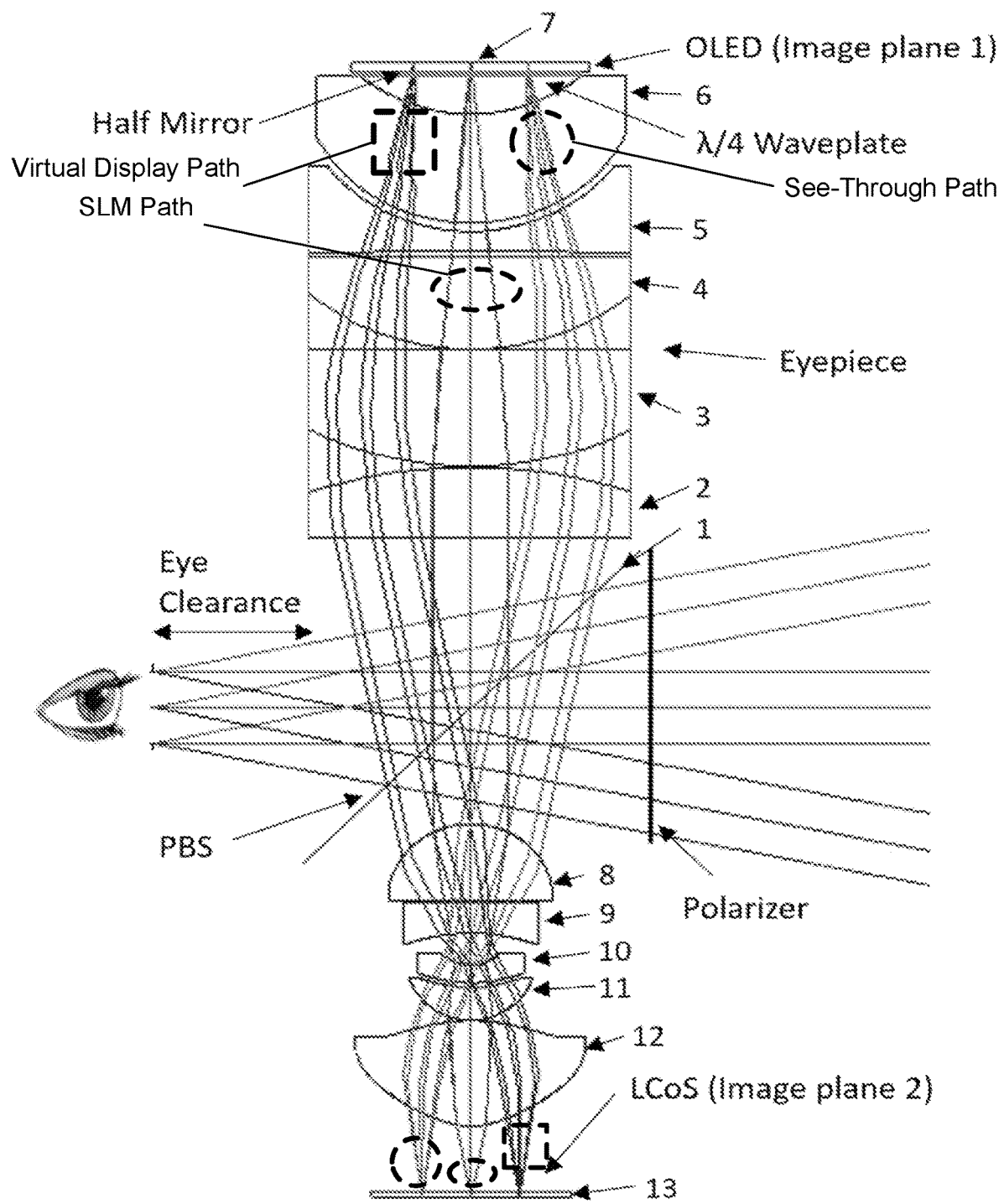
FIG. 3 illustrates a layout of optical components of a prototype OCOST-HMD in accordance with an example embodiment.

To achieve a high optical performance over the three optical paths, we optimized the system using 3 zoom configurations, each corresponding to a different optical path and design specification. FIG. 3 illustrates the lens layout of the final OCOST-HMD of the prototype design. The light path for the virtual display (eyepiece) is denoted by the rays designated with the dashed rectangle, while the light path for the SLM (relay+eyepiece) is shown by the rays designated with the dashed oval, and the see-through path (objective+ relay+eyepiece) is denoted by the rays designated with the dashed circle. It should be noted that the see-through path overlaps with the microdisplay and the SLM paths after the PBS and thus only the virtual display rays are traced to the eye pupil.

Overall, the final lens design of the prototype example in FIG. 3 includes 10 lenses, including 5 stock crown glass lenses, 3 acrylic aspheric lenses and 2 custom flint glass lenses. Lenses labeled as 2 to 6 form the eyepiece group. Lenses labeled as 8 to 12 form the objective group. The half-mirror is illustrated as the gray element between the quarter-wave plate and the OLED 7. A wire grid polarizer and QWP film in conjunction with a single custom PBS from Moxtek was used to manipulate the polarization. The system was optimized for 3 wavelengths, 430, 555, and 625 nm with weights of 1, 2 and 1, respectively, in accordance to the dominant wavelengths of the OLED microdisplay. To ensure the system was properly pupil-matched for correct viewing perspective in accordance with Eq. (1) and (2), the objective and eyepiece were optimized to have a chief ray deviation of less than ±0.5°, demonstrating image space telecentricity. The eyepiece lenses, we were cropped to achieve an eye clearance of 20 mm and a 10 mm EPD.

Tables 2-9 provide the optics prescriptions for the virtual display path and the see-through path, respectively, for the above prototype system. Both of the optical paths were ray-traced from the exit pupil of the system, which coincides with the entrance pupil of the eye. The term "Asphere" in the Tables refers to an aspherical surface which may be represented by the equation $$z = \frac{cr^2}{1+\sqrt{1-(1+k)c^2r^2}} + Ar^4 + Br^6 + Cr^8 + Dr^{10} + Er^{12},$$

where z is the sag of the surface measured along the z-axis of a local x, y, z coordinate system, c is the vertex curvature, r is the radial distance, k is the conic constant, A through E are the 4th, 6th, 8th, 10th and 12th order deformation coefficients, respectively. Tables 4 through 9 provide the asphieric coefficients for the aspheric surfaces 11, 12, 15, 16, 23, and 24 respectively.

TABLE 2

System prescription for the virtual display path

| Element number used in figures | Surface No. | Surface Type | Y Radius | Thickness | Material | Refract Mode |
|---|---|---|---|---|---|---|
| Stop | 1 | Sphere | Infinity | Infinity | | Refract |
| | | Sphere | Infinity | 33.16 | | Refract |
| 1 | 2 | Sphere | Infinity | 0 | NBK7 | Reflect |
| | | Sphere | Infinity | −18.93 | | Refract |
| 2 | 3 | Sphere | Infinity | −7.9 | NBK7 | Refract |
| | 4 | Sphere | 51.68 | −0.1 | | Refract |
| 3 | 5 | Sphere | −36.33 | −13 | NBK7 | Refract |
| | 6 | Sphere | Infinity | −0.10 | | Refract |
| 4 | 7 | Sphere | −25.95 | −10.3 | NBK7 | Refract |
| | 8 | Sphere | Infinity | −0.66 | | Refract |
| 5 | 9 | Sphere | 542.94 | −2.17 | NSF11 | Refract |
| | 10 | Sphere | −18.97 | −0.96 | | Refract |
| 6 | 11 | Aspheric | −18.44 | −12.15 | PMMA | Refract |
| | 12 | Aspheric | −16.04 | −4.84 | | Refract |
| 7 | 13 | Sphere | Infinity | −1.6 | NBK7 | Refract |
| | 14 | Sphere | Infinity | 0 | | Refract |

TABLE 3

System prescription for the see-through path

| Element number used in figures | Surface No. | Surface Type | Y Radius | Thickness | Material | Refract Mode |
|---|---|---|---|---|---|---|
| Stop | 1 | Sphere | Infinity | Infinity | | Refract |
| | | Sphere | Infinity | 33.16 | | Refract |
| 1 | 2 | Sphere | Infinity | 0 | NBK7 | Reflect |
| | | Sphere | Infinity | −18.93 | | Refract |
| 2 | 3 | Sphere | Infinity | −7.9 | NBK7 | Refract |
| | 4 | Sphere | 51.68 | −0.1 | | Refract |
| 3 | 5 | Sphere | −36.33 | −13 | NBK7 | Refract |
| | 6 | Sphere | Infinity | −0.10 | | Refract |
| 4 | 7 | Sphere | −25.95 | −10.3 | NBK7 | Refract |
| | 8 | Sphere | Infinity | −0.66 | | Refract |
| 5 | 9 | Sphere | 542.94 | −2.17 | NSF11 | Refract |
| | 10 | Sphere | −18.97 | −0.96 | | Refract |
| 6 | 11 | Asphere | −18.44 | −12.15 | PMMA | Refract |
| | 12 | Asphere | −16.04 | −4.84 | | Refract |
| 7 | 13 | Sphere | Infinity | −1 | NBK7 | Refract |
| | 14 | Sphere | Infinity | 0 | | Reflect |
| 7 | 14 | Sphere | Infinity | 1 | NBK7 | Refract |
| | 13 | Sphere | Infinity | 4.84 | | Refract |
| 6 | 12 | Asphere | −16.04 | 12.15 | PMMA | Refract |
| | 11 | Asphere | −18.44 | 0.96 | | Refract |
| 5 | 10 | Sphere | −18.97 | 2.17 | NSF11 | Refract |
| | 9 | Sphere | 542.94 | 0.66 | | Refract |
| 4 | 8 | Sphere | Infinity | 10.3 | NBK7 | Refract |
| | 7 | Sphere | −25.95 | 0.10 | | Refract |
| 3 | 6 | Sphere | Infinity | 13 | NBK7 | Refract |
| | 5 | Sphere | −36.33 | 0.1 | | Refract |
| 2 | 4 | Sphere | 51.68 | 7.9 | NBK7 | Refract |
| | 3 | Sphere | Infinity | 0 | | Refract |
| | | Sphere | Infinity | 18.93 | | Refract |
| 1 | 2 | Sphere | Infinity | 0.7 | NBK7 | Refract |
| | | Sphere | Infinity | 12.31 | | Refract |
| 8 | 15 | Asphere | 8.89 | 8.55 | PMMA | Refract |
| | 16 | Asphere | −103.15 | 0.10 | | Refract |
| 9 | 17 | Sphere | Infinity | 3.5 | NSF11 | Refract |
| | 18 | Sphere | 19.62 | 3.59 | | Refract |
| 10 | 19 | Sphere | −4.23 | 1.97 | NSF11 | Refract |
| | 20 | Sphere | −14.76 | 0.48 | | Refract |

TABLE 3-continued

System prescription for the see-through path

| Element number used in figures | Surface No. | Surface Type | Y Radius | Thickness | Material | Refract Mode |
|---|---|---|---|---|---|---|
| 11 | 21 | Sphere | −14.52 | 3.65 | NBK7 | Refract |
|  | 22 | Sphere | −6.83 | 0.048 |  | Refract |
| 12 | 23 | Asphere | 16.16 | 11.72 | PMMA | Refract |
|  | 24 | Asphere | −7.77 | 7.39 |  | Refract |
| 13 | 25 | Sphere | Infinity | 0.7 | NBK7 | Refract |
|  | 26 | Sphere | Infinity | 0 |  | Reflect |
| 13 | 26 | Sphere | Infinity | 0 | NBK7 | Refract |
|  | 25 | Sphere | Infinity | −0.7 |  | Refract |
| 12 | 24 | Asphere | −7.77 | −7.39 | PMMA | Refract |
|  | 23 | Asphere | 16.16 | −11.72 |  | Refract |
| 11 | 22 | Sphere | −6.83 | −0.048 | NBK7 | Refract |
|  | 21 | Sphere | −14.52 | −3.65 |  | Refract |
| 10 | 20 | Sphere | −14.76 | −0.48 | NSF11 | Refract |
|  | 19 | Sphere | −4.23 | −1.97 |  | Refract |
| 9 | 18 | Sphere | 19.62 | −3.59 | NSF11 | Refract |
|  | 17 | Sphere | Infinity | −3.5 |  | Refract |
| 8 | 16 | Asphere | −103.15 | −0.10 | PMMA | Refract |
|  | 15 | Asphere | 8.89 | −8.55 |  | Refract |
|  |  | Sphere | Infinity | −12.31 |  | Refract |
| 1 | 2 | Sphere | Infinity | 0 |  | Reflect |
|  |  | Sphere | Infinity | Infinity |  | Refract |

TABLE 4

Surface Prescription for Surface #11 of Table 2.

| | |
|---|---|
| Y Radius | −18.44 |
| Conic Constant (K) | −0.356 |
| 4th Order Coefficient (A) | −6.23E−07 |
| 6th Order Coefficient (B) | −4.35E−08 |
| 8th Order Coefficient (C) | 1.02E−10 |
| 10th Order Coefficient (D) | −1.67E−13 |
| 12th Order Coefficient (E) | −3.43E−15 |

TABLE 5

Surface Prescription for Surface #12 of Table 2.

| | |
|---|---|
| Y Radius | −16.039 |
| Conic Constant (K) | −0.42 |
| 4th Order Coefficient (A) | 1.75E−05 |
| 6th Order Coefficient (B) | 2.54E−07 |
| 8th Order Coefficient (C) | −3.79E−09 |
| 10th Order Coefficient (D) | 3.20E−11 |
| 12th Order Coefficient (E) | −1.48E−13 |

TABLE 6

Surface Prescription for Surface #15 of Table 3.

| | |
|---|---|
| Y Radius | 8.89 |
| Conic Constant (K) | 0.042 |
| 4th Order Coefficient (A) | 1.69E−05 |
| 6th Order Coefficient (B) | 2.84E−07 |
| 8th Order Coefficient (C) | −5.89E−09 |
| 10th Order Coefficient (D) | 4.47E−11 |

TABLE 7

Surface Prescription for Surface #16 of Table 3.

| | |
|---|---|
| Y Radius | −103.15 |
| Conic Constant (K) | −90.09 |
| 4th Order Coefficient (A) | 0.0001295 |
| 6th Order Coefficient (B) | −1.45E−06 |

TABLE 7-continued

Surface Prescription for Surface #16 of Table 3.

| | |
|---|---|
| 8th Order Coefficient (C) | 1.65E−08 |
| 10th Order Coefficient (D) | −1.01E−10 |

TABLE 8

Surface Prescription for Surface #23 of Table 3.

| | |
|---|---|
| Y Radius | 16.16 |
| Conic Constant (K) | −19.04 |
| 4th Order Coefficient (A) | 0.000273 |
| 6th Order Coefficient (B) | −5.03E−06 |
| 8th Order Coefficient (C) | 5.25E−08 |
| 10th Order Coefficient (D) | −2.78E−10 |

TABLE 9

Surface Prescription for Surface #24 of Table 3.

| | |
|---|---|
| Y Radius | −7.77 |
| Conic Constant (K) | −0.83 |
| 4th Order Coefficient (A) | 0.00042 |
| 6th Order Coefficient (B) | −3.76E−06 |
| 8th Order Coefficient (C) | 2.94E−08 |
| 10th Order Coefficient (D) | −1.29E−10 |

The simulated optical performance of the double pass OCOST-HMD prototype system was assessed over the full FOV in the display space where the spatial frequencies are characterized in terms of cycles per millimeter. In the example provided, the optical performance of the see-through path is limited to a 40° diagonal in accordance to the field that is passed through the system and optically overlaid on the virtual and masked image. Light from the real scene outside this field passes though only a single PBS and is not optically affected and should be otherwise seen at the native resolution of the human eye.

Figure 4A:
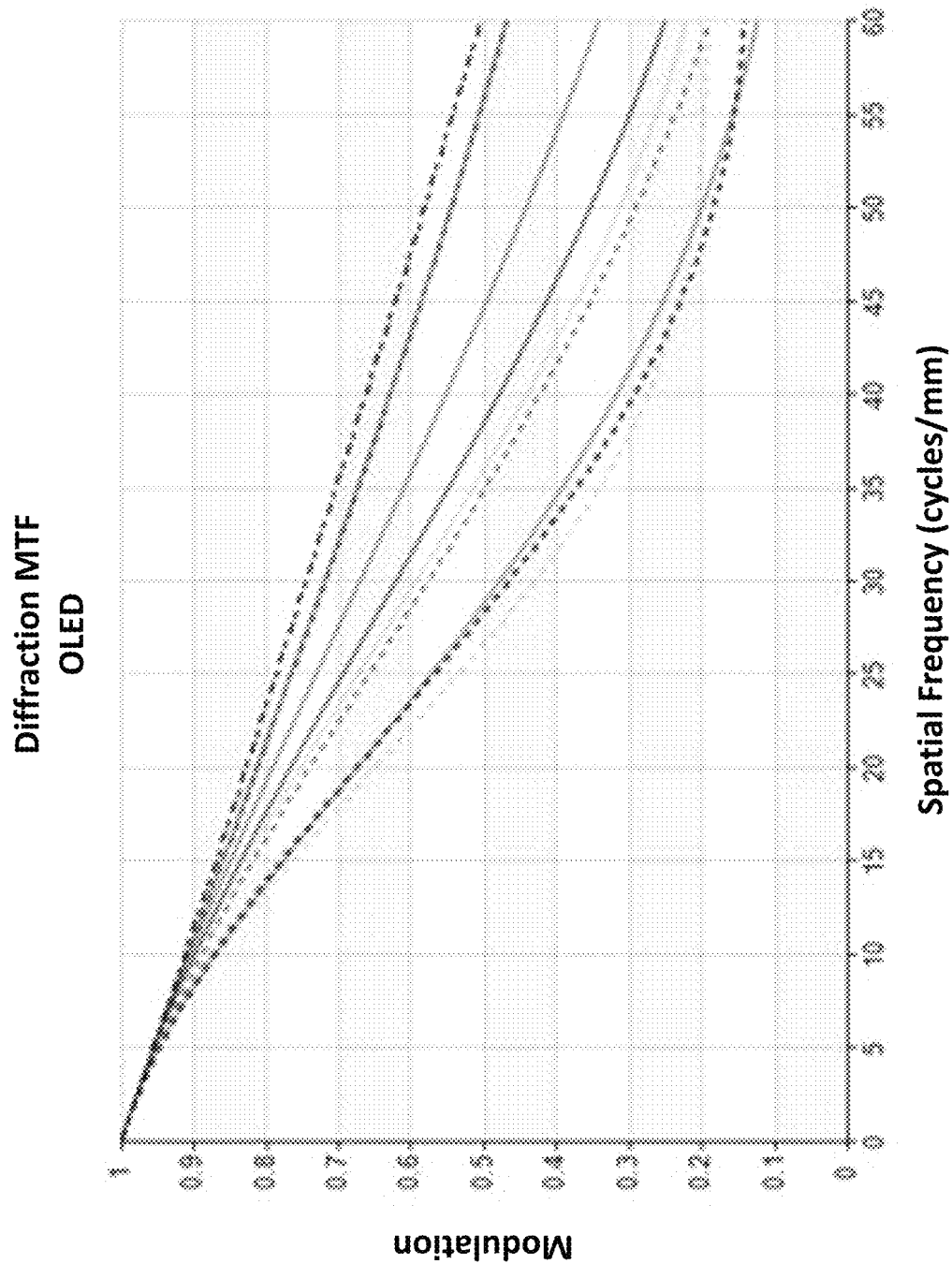
FIG. 4A illustrates modulation transfer function (MTF) plots for the virtual display path of an example OCOST-HMD system in accordance with the disclosed embodiments.
Figure 4B:
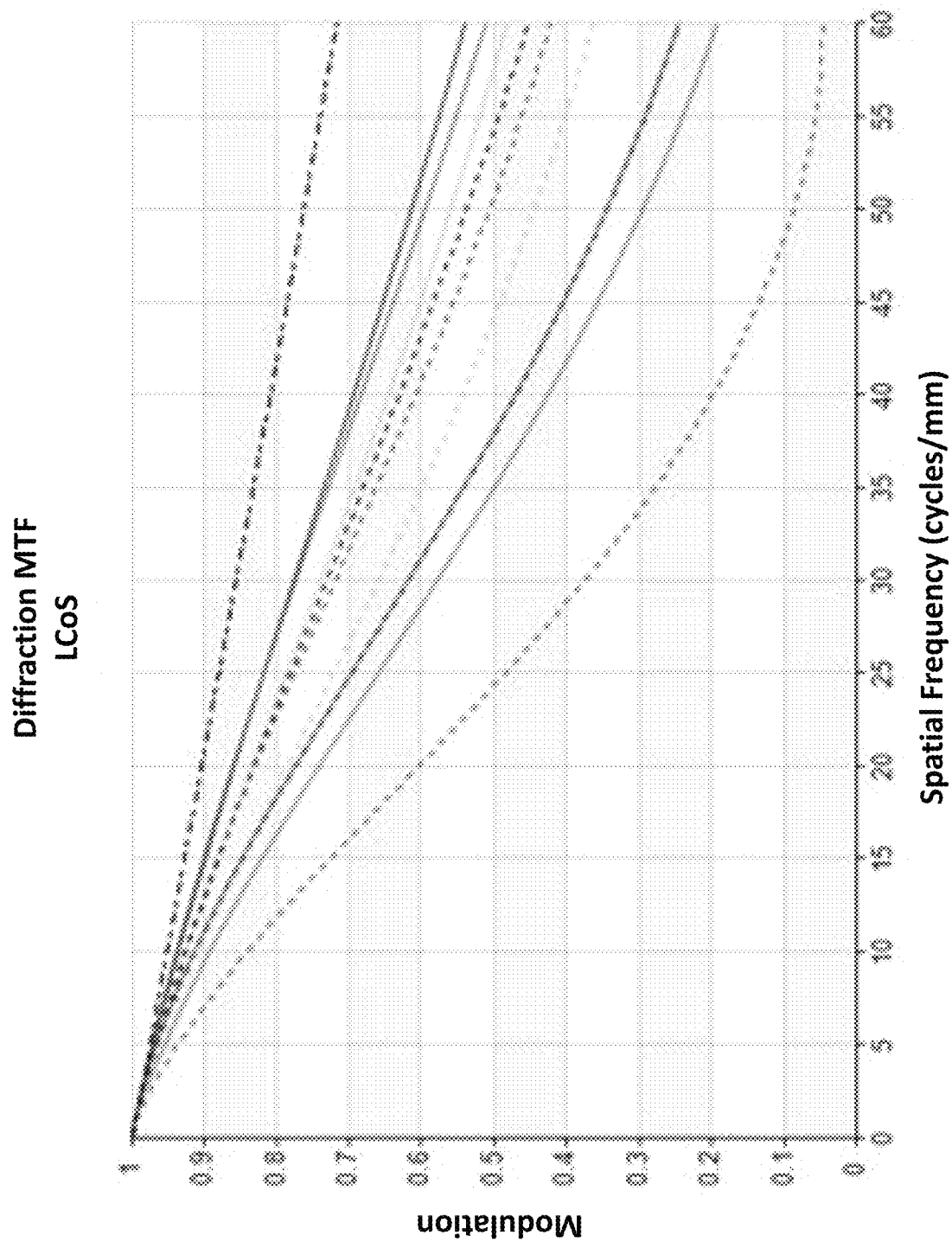
FIG. 4B illustrates MTF plots for the spatial light modulator (SLM) path of an example OCOST-HMD system in accordance with the disclosed embodiments.

FIGS. 4A to 4C show the polychromatic modulation transfer function (MTF) curves, evaluated with a 4-mm eye pupil, such that it is similar to the human eye, for several weighted fields of the virtual display, SLM and the see-through paths. In these figures, the modulation transfer function of 0, 6, 10, 15 and 20 degree are evaluated for the transverse (Tan) and radial (Rad) diagonal half FOV with a 4 mm pupil diameter and a cutoff spatial frequency of 53 cycles/mm are plotted for the OCOST-HMD OLED optical path (FIG. 4A), OCOST-HMD SLM optical path (FIG. 4B), and 110 cycles/degree for the OCOST-HMD see-through optical path (FIG. 4C). Staring with FIG. 4A, the OLED display optical performance preserves roughly an average of 40% modulation, over the full field, at the designed Nyquist frequency of 52 cycles/mm, corresponding to the 9.6 μm pixel size. The optical performance of the LCoS, shown in FIG. 4B demonstrates an average of 50% modulation over the full field, at the designed Nyquist frequency of 47 cycles/mm, corresponding to the 10.7 μm pixel size. Lastly, FIG. 4C shows the see-through optical performance which maintains an average modulation of 15% at the human eye's cutoff frequency of 110 cycles/mm corresponding to a 1.0 arcminute resolution or 20/20 human visual acuity.

Figure 5:
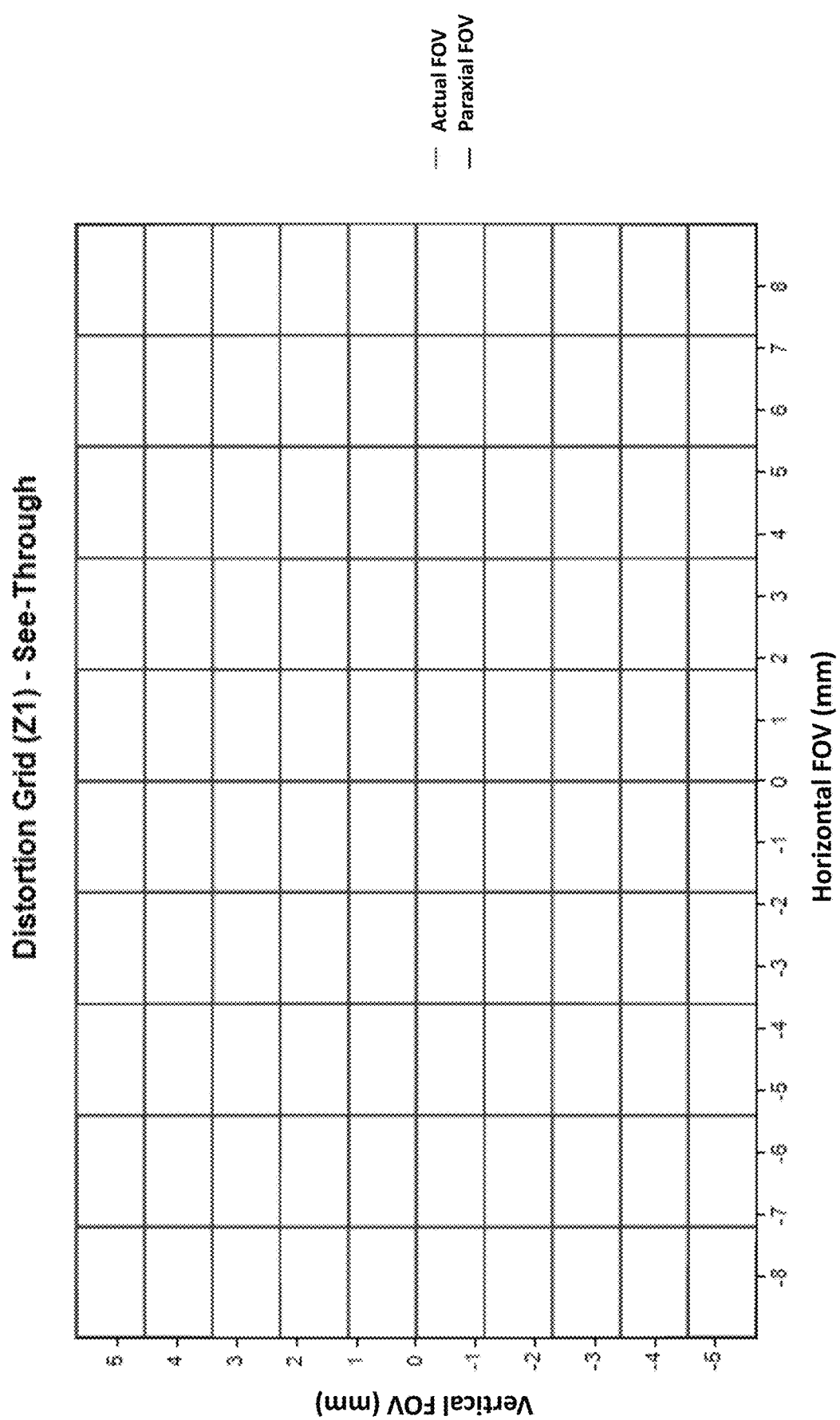
FIG. 5 illustrates a distortion grid of the see-through optical path over the full 40-degree diagonal field of view (FOV) for an example OCOST-HMD system in accordance with the disclosed embodiments.

FIG. 5 shows the distortion grid of the see-through optical path over the full 40-degree diagonal FOV that is overlapped with the virtual image. In the figure, the actual and paraxial FOV are almost coincident, illustrating strong agreement between the two. Per our optical specifications seen in Table 1 above, the see-through path has <1% distortion over the full field. This is important because unlike the display distortion that can be digitally corrected, the see-through path cannot. The distortion for the microdisplay (virtual image) was held under 5% while the distortion for the SLM (optical mask) was held to 20% for digital correction.

Along with the MTF and distortion, several other metrics were used to characterize the optical performance of the virtual display path, such as wave front error and spot diagram. Both the SLM and microdisplay paths suffer largely from lateral chromatic aberration and coma. This is due to the non-pupil forming, telecentric design of the eyepiece utilized in both the SLM and microdisplay path not allowing for the stop position to be moved to balance off-axis aberrations. Overall, the wavefront aberration in each of the three paths is sufficiently low, being under 1 wave. The average root mean square (RMS) spot diameter across the field is 9 μm for both the see-through path and the display path however jumps to 16.4 μm for the SLM path due to such large allowed distortion. Although it appears to be larger than the 10.7 μm pixel size, this difference is largely due to lateral chromatic aberration, and can be corrected.

Example System Prototype and Experimental Demonstration

Figure 6:
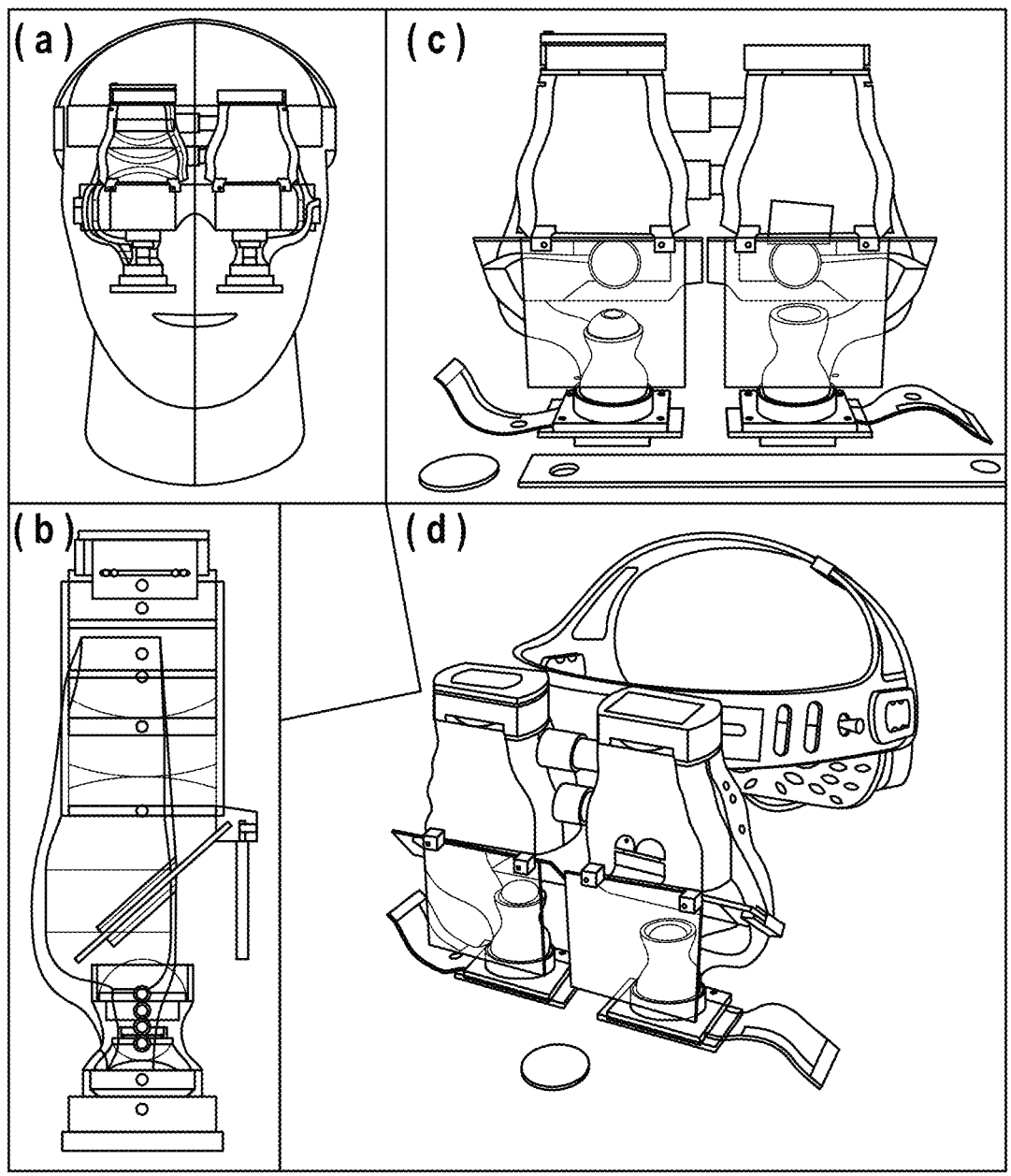
FIG. 6 illustrates an example OCOST-HMD layout and prototype according to the disclosed embodiments.

FIG. 6 illustrates an example OCOST-HMD layout and prototype according to the disclosed embodiments. Panel (a) shows the front view of the fully assembled OCOST-HMD Solidworks CAD design in reference to an average human head. Panel (b) shows the side view of the fully assembled OCOST-HMD CAD design, where it demonstrates the greatly reduced form factor due to the double pass architecture. Due to multiple passes of the light through the same optical path, the optical performance is sensitive to the optical and mechanical tolerancing. For the mechanical design, individual lenses were held by set screws to achieve more compensation and lower the tolerance stack in the mechanical design to meet the minimum MTF requirements. Panels (c) and (d) show a front view and an angled view, respectively, of the binocular prototype of the OCOST-HMD system built upon the optical design in FIG. 3, further illustrating a quarter (coin) to provide a size metric. The overall height and width of the prototyped OCOST-HMD system was 130 mm by 140 mm, with a depth of 25 mm and an adjustable intraocular distance of 50-70 mm.

Figure 7:
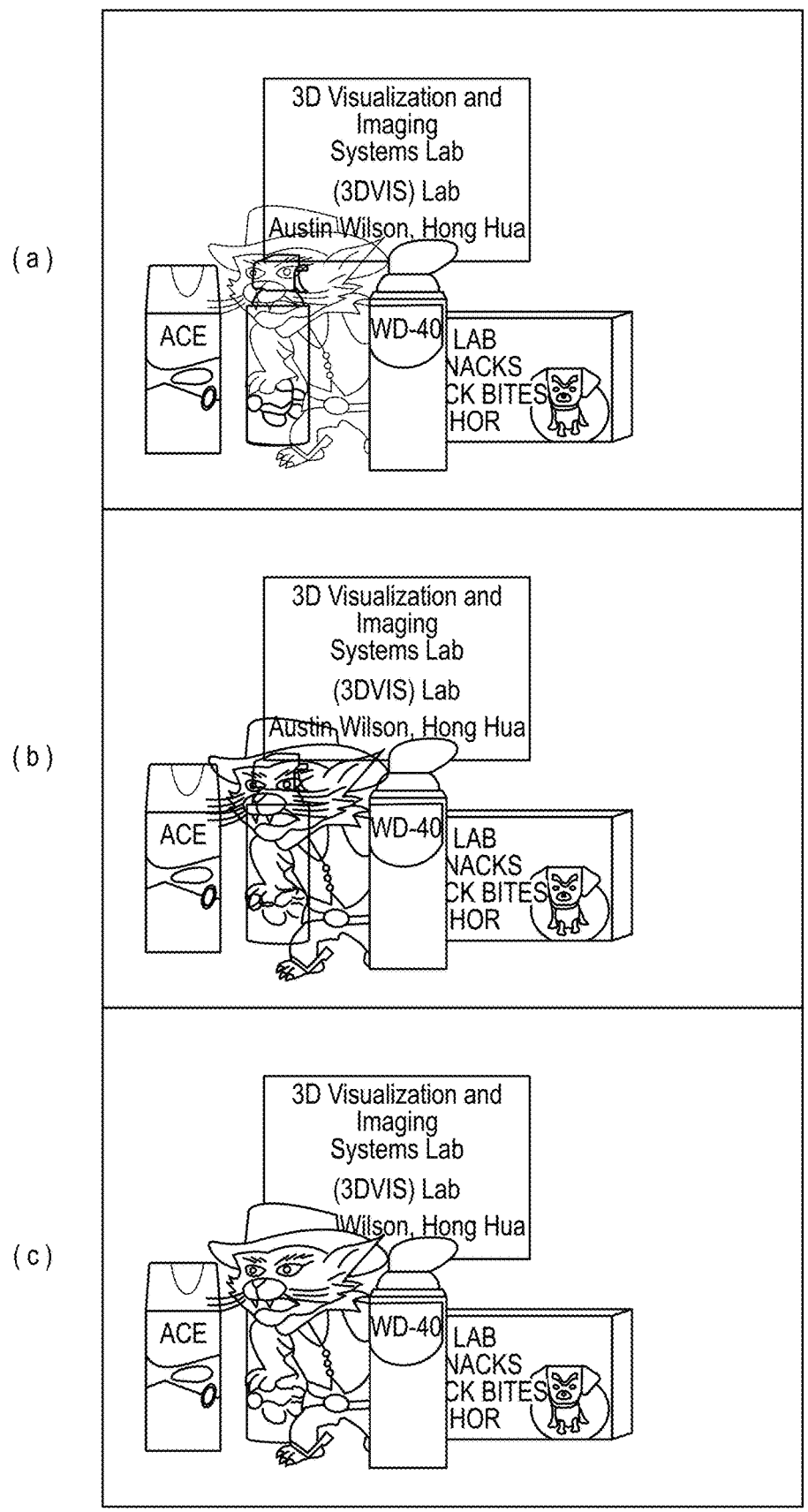
FIG. 7A illustrates an example augmented view of the real-world and virtual scenes without the occlusion capability enabled.
FIG. 7B illustrates an example real-world scene when an occlusion mask is displayed on an SLM but with no virtual content shown on an OLED display.
FIG. 7C illustrates an example view captured with the mask on the SLM and the virtual scene displayed on the OLED display, and where a virtual content is inserted between two real object.

FIG. 7 shows a qualitative demonstration of the occlusion capability of the prototyped OCOST-HMD of FIGS. 3 and 6. A real-world background scene comprising common objects (text, cans and boxes with different colors, shapes and printed fonts) were used to provide several different spatial frequencies and object depths: these items were placed against a well-illuminated white background wall (~300-500 cd/m2). The virtual 3D scene used in this example was that of a simple image of a wildcat. Panels (a) to (c) in FIG. 7 show a set of images captured with a digital camera placed at the exit pupil of the eyepiece. The same 16 mm camera lens and ⅓" Point Grey image sensor with 3.75 μm pixel pitch was used with an increased 4 mm aperture, to better match the F/ #of the human eye under typical lighting conditions.

By simply turning on the OLED microdisplay and applying no modulated mask to the SLM, panel (a) in FIG. 7 shows the augmented view of the real-world and virtual scenes without the occlusion capability enabled. Without the mask occluding the see-through path, the "wildcat" figure with a cowboy hat (see panels (b) for a better outline of the wildcat) looks washed out, appearing transparent and unrealistic due to the brightness of the background scene shared with the virtual display. This causes the depth of the wildcat to be spatially ambiguous.

Panel (b) portrays the opposite situation: a view of the real-world scene when the occlusion mask was displayed on the SLM but no virtual content was shown on the OLED display. This validates that the mask can effectively block the superimposed portion of the sea-through view.

Panel (c) shows a view captured with the mask on the SLM and the virtual scene displayed on the OLED display, where the virtual wildcat is inserted between two real objects, demonstrating the mutual occlusion capability of the system. In this case, the full capability and correct depth perception along with improved contrast is rendered. By knowing the relative location of the WD-40 canister, which is meant to occlude part of the wildcat figure, we removed the pixels that correspond to the projection of the occluding canister on the virtual display from the wildcat rendering. Again, the significance of the result is that correct occlusion relationships can be created and used to give an unparalleled sense of depth to a virtual image in an OST-HMD.

The disclosed double-pass OCOST-HMD system can achieve a high optical performance and dynamic range of the real and virtual content with a significantly improved formfactor, viewpoint perspective and technical specifications over our previous OCOST-HMD design.

Example Optical Performance Test Results: The vertical and horizontal FOV of the example system was measured for each optical path. It was determined that the see-through FOV was ~90° horizontally and ~40° vertically with an occlusion capable see-through FOV ~34° horizontally and ~26° vertically, while the virtual display had an FOV of ~33.5° horizontally and ~23° vertically, giving a measured diagonal Full FOV of 41.6°. Due to our improved double pass architecture and added optical relay the LCoS can fully occlude the virtually displayed scene.

The optical performance of the prototype system was further quantified by characterizing the MTF performance of the three optical paths through the prototype. A high-performance camera, consisting of a nearly diffraction-limited 25 mm camera lens by Edmund Optic and a 1/2.3" Point Grey image sensor of a 1.55 μm pixel pitch was placed at the exit pupil of the system. It offers an angular resolution of about 0.5 arcminutes per pixel, significantly higher than the anticipated performance of the prototype. Therefore, it is assumed that no loss of performance to the MTF was caused by the camera. The camera then captured images of a slanted edge target, which were either displayed by the microdisplay at an angle or a printed target placed in the see-through view. To provide a separable quantification of the performance for the virtual and see-through path, the virtual image of a slanted edge was taken while the see-through scene was completely blocked by the SLM. Similarly, the see-through image of the target was taken with the microdisplay turned off. The captured slanted-edge images were analyzed using Imatest® software to obtain the MTF of the corresponding light paths.

Figure 8:
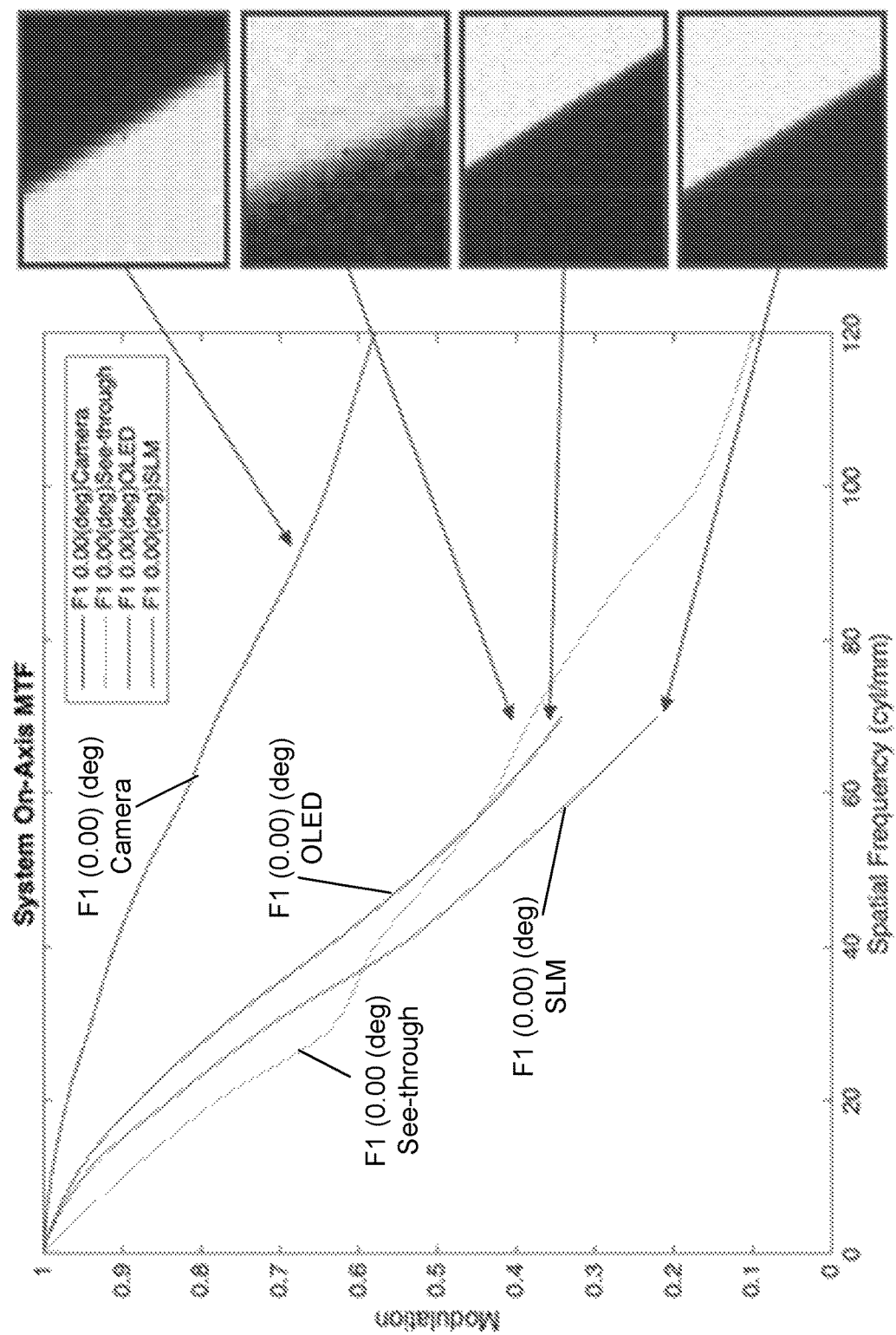
FIG. 8 shows measured on-axis MTF plots for SLM, OLED and optical see-through path and camera in accordance with an example embodiment.

FIG. 8 shows the measured on-axis MTF performance of the SLM, OLED and optical see-through path and camera, along with each individual slanted edge. Due to the magnification difference between the pixel pitch of the camera sensor and the microdisplay and SLM, the horizontal axis of the MTF measurement by Imatest® was scaled by the pixel magnification difference between the camera and display and then converted to define the spatial frequency in the visual display space in terms of cycles/mm. The prototyped design was able to achieve a contrast greater than 50% at the Nyquist frequency 53 cycles/mm of the virtual display and similar performance for the SLM path. While the modulation contrast for the see-through path was about 15% at the cut-off frequency of 110 cycles/mm corresponding to 1 arcminute. The curves shown in FIG. 8 closely resemble the on-axis curves in FIG. 3, demonstrating that the resolvability of three optical paths through the occlusion module is nearly intact with the designed specifications originally set out and a human viewer.

We measured the image contrast between the virtual display and the real-world scene as a function of the real-world scene brightness for different spatial frequencies. A grayscale solid image, ranging from black to white in 10 linear steps, was displayed on an LCD monitor to create a controlled background scene with varying luminance from 0 to 350 cd/m2. The monitor was placed roughly 10 cm in front of the OCOST-HMD system to simulate an array of real scene brightness. A sinusoidal grating pattern with a spatial frequency ranging from 0.88 to 28.2 cycles/degree was displayed on the OLED microdisplay (virtual path) to evaluate the effect of scene brightness on the image contrast of the virtual scene at different spatial frequencies. The fall-off in contrast to the virtual scene was then plotted and compared with occlusion enabled (SLM blocking see-through light) and without occlusion (SLM passing see-through light).

Figure 9A:
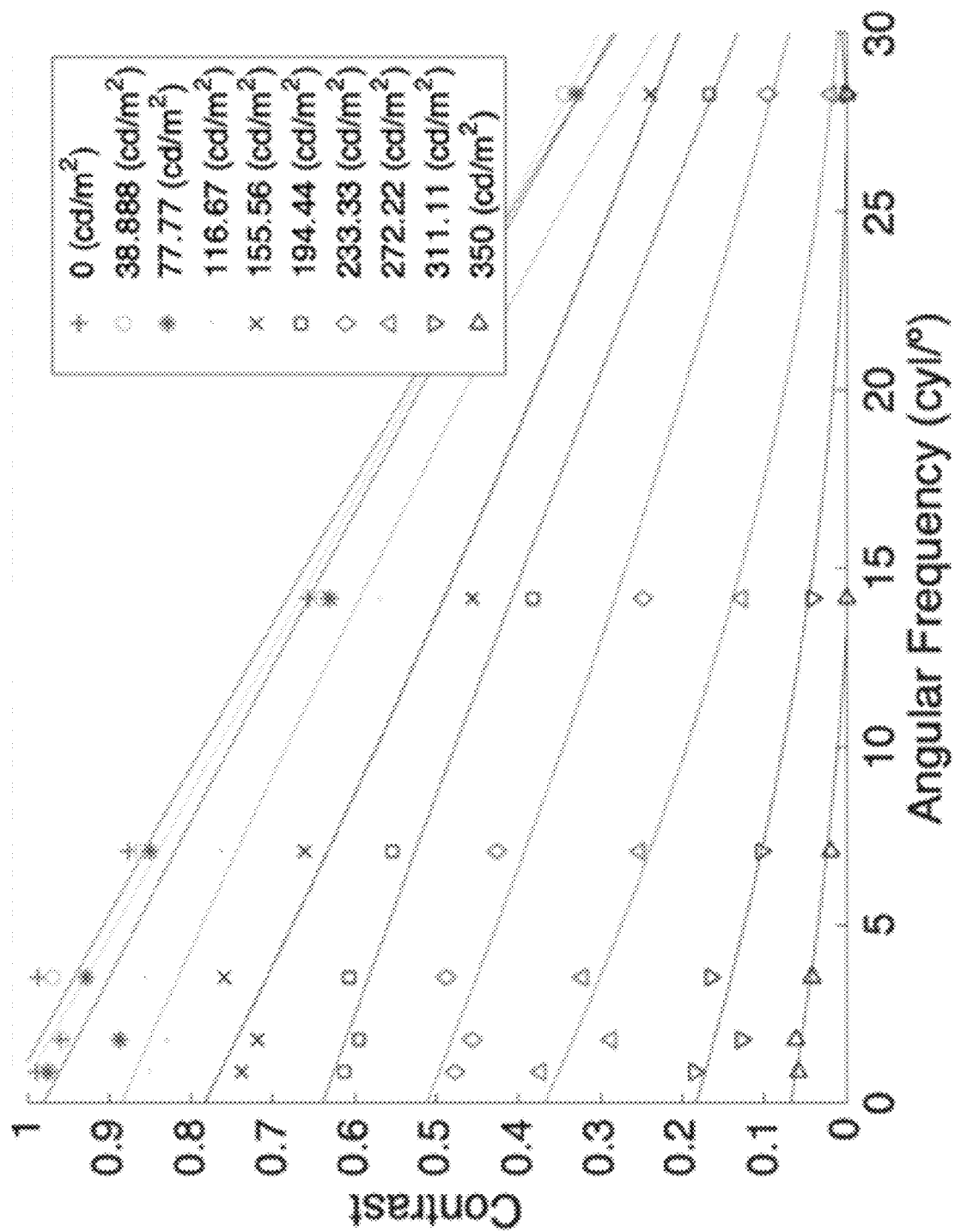
FIG. 9A shows example plots illustrating image contrast degradation of a virtual object for different background scene brightness values, where occlusion is disabled.
Figure 9B:
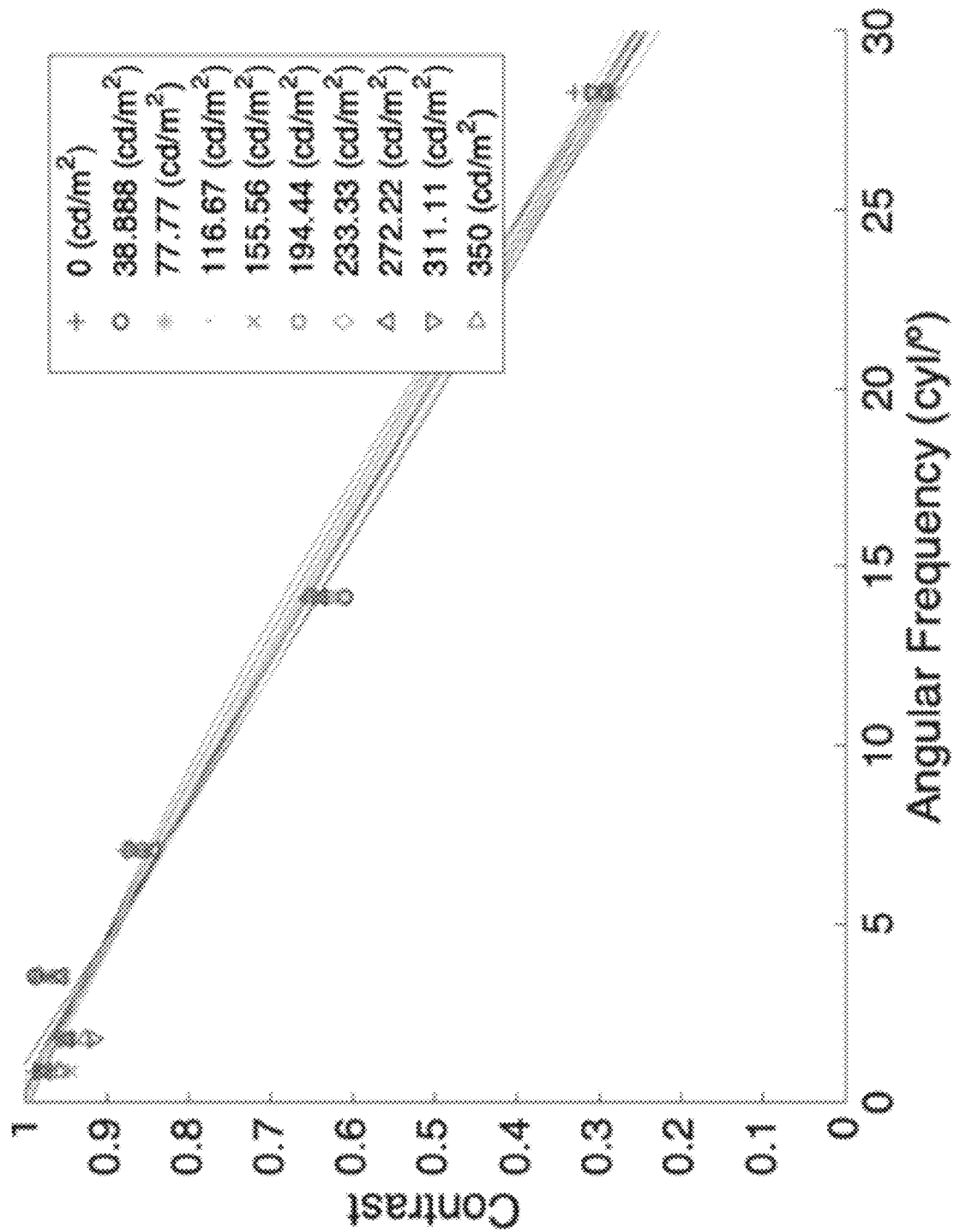
FIG. 9B shows example plots illustrating image contrast degradation of the virtual object for different background scene brightness values with occlusion is enabled.

FIGS. 9A and 9B illustrate plots of the virtual object contrast with the see-through path un-occluded and occluded, respectively. We can observe that the contrast of the virtual object without occlusion (FIG. 9A) quickly deteriorated to zero for a well-lit environment luminance above 300 cd/m2, while the contrast of the virtual target with occlusion of the real scene (FIG. 9B) was nearly constant over an increased brightness. We further measured the obtainable contrast ratio by measuring a collimated depolarized light source through the system with full occlusion being enabled and disabled. The dynamic range of the occlusion system was determined to be greater than 100:1.

One aspect of the disclosed embodiments relates to an occlusion-capable optical see-through head-mount display (OCOST-HMD) that includes a polarization element configured to receive light from a real scene and to produce polarized light at the output thereof, a polarizing beam splitter (PBS), an objective lens, a spatial light modulator (SLM), an eyepiece lens, a quarter wave plate (QWP), and a reflective optical element configured to reflect substantially all or a portion of light that is incident thereupon in a first direction, and to transit substantially all or a portion of light received from a microdisplay that is incident thereupon from a second direction. The SLM and the objective lens form a first double-pass configuration that allows at least a portion of light that passes through the objective lens to be reflected from the SLM and to propagate again through the objective lens. The eyepiece lens and the reflective optical element form a second double-pass configuration that allows at least a portion of light that passes through the eyepiece lens to be reflected from the reflective optical element and to propagate again through the eyepiece lens.

In one example embodiment, the PBS is positioned to receive the polarized light and reflect the polarized light towards the objective lens; the PBS is also positioned to receive, and transmit therethrough toward the eyepiece lens, light that is output from the first double-pass configuration, and to reflect light that the PBS receives from the second double-pass configuration, including light from the microdisplay, towards a position of a human eye. In another example embodiment, the OCOST-HMD further includes a first reflecting surface, wherein, the PBS is positioned to (a) receive the polarized light and transmit therethrough the polarized light towards the objective lens, (b) receive, and reflect toward the eyepiece lens, light that is output from the first double-pass configuration, and (c) reflect light that the PBS receives from the second double-pass configuration, including light from the microdisplay, towards the first reflecting surface. In this example embodiment, the first reflecting surface is positioned to reflect light that is incident thereupon towards a position of a human eye.

According to one example embodiment, the SLM is configured to modulate the light that is incident thereupon. For example, the SLM is configured to operate in an on-off modulation mode. In another example embodiment, the OCOST-HMD further includes an occlusion mask corresponding to a virtual image presented on the microdisplay, wherein the occlusion mask is used to effectuate modulation of one or more regions of the SLM. In yet another example embodiment, the OCOST-HMD further includes the microdisplay. In still another example embodiment, the reflective optical element is positioned on a surface of the microdisplay. According to another example embodiment, the microdisplay includes an organic light emitting diode (OLED) device.

In another example embodiment, the QWP is positioned between the eyepiece lens and the reflective optical element. In one example embodiment, the QWP is positioned between the eyepiece lens and the PBS. In another example embodiment, the SLM includes a liquid crystal on silicon (LCoS) device. In still another example embodiment, the OCOST-HMD is configured to produce an erect image without using a roof prism. In another example embodiment, the OCOST-HMD provides a pupil-matched optical configuration that maps a user's pupil, or relayed pupil, back to the user's eye position to enable a correct view point disparity to be maintained. According to yet another example embodiment, the OCOST-HMD is configured to produce a field of view (FOV) that is not limited by the eyepiece lens in at least one direction.

In another example embodiment, the OCOST-HMD has a field of view (FOV) greater than 40 degree diagonally and an optical performance that is greater than 20% modulation contrast over a full FOV. In one example embodiment, the OCOST-HMD has a see-through field of view (FOV) of 90 degrees by 40 degrees with an angular resolution of 1.0 arc minutes. In yet another example embodiment, a least a portion of the OCOST-HMD corresponds to a set of two afocal 4f relays that image an entrance pupil to a conjugate intermediate pupil location. In another example embodiment, the OCOST-HMD forms a single-layer, double-pass, pupil matched OCOST-HMD. In one some example embodiments, the OCOST-HMD includes one or both of the following: (a) an objective lens group that includes the objective lens, or (b) an eyepiece lens group that includes the eyepiece lens.

Another aspect of the disclosed embodiments relates to an occlusion-capable optical see-through head-mount display (OCOST-HMD) that includes a polarizer to produce polarized light associated with a real scene, a beam splitter (PBS), an objective lens, a spatial light modulator (SLM), an eyepiece lens, a retarder, and a half-mirror configured to reflect substantially all of light associated with an occlusion mask that is incident thereupon in a first direction, and to transit substantially all of light associated with a virtual scene that is incident thereupon from a second direction. In this configuration, the PBS is positioned to (a) receive and direct the polarized light toward the SLM, (b) receive and direct the light associated with the virtual scene toward a position for viewing by a user's eye, and (c) receive and direct the light associated with the occlusion mask toward the half mirror. The SLM is configured to modulate the light incident thereon in accordance with a two-dimensional shape of the occlusion mask. The OCOST-HMD is configured to produce an erect image, and the position of a user's pupil, or relayed pupil, is mapped to the position of the user's eye to enable a correct view point disparity to be maintained.

Figure 10:
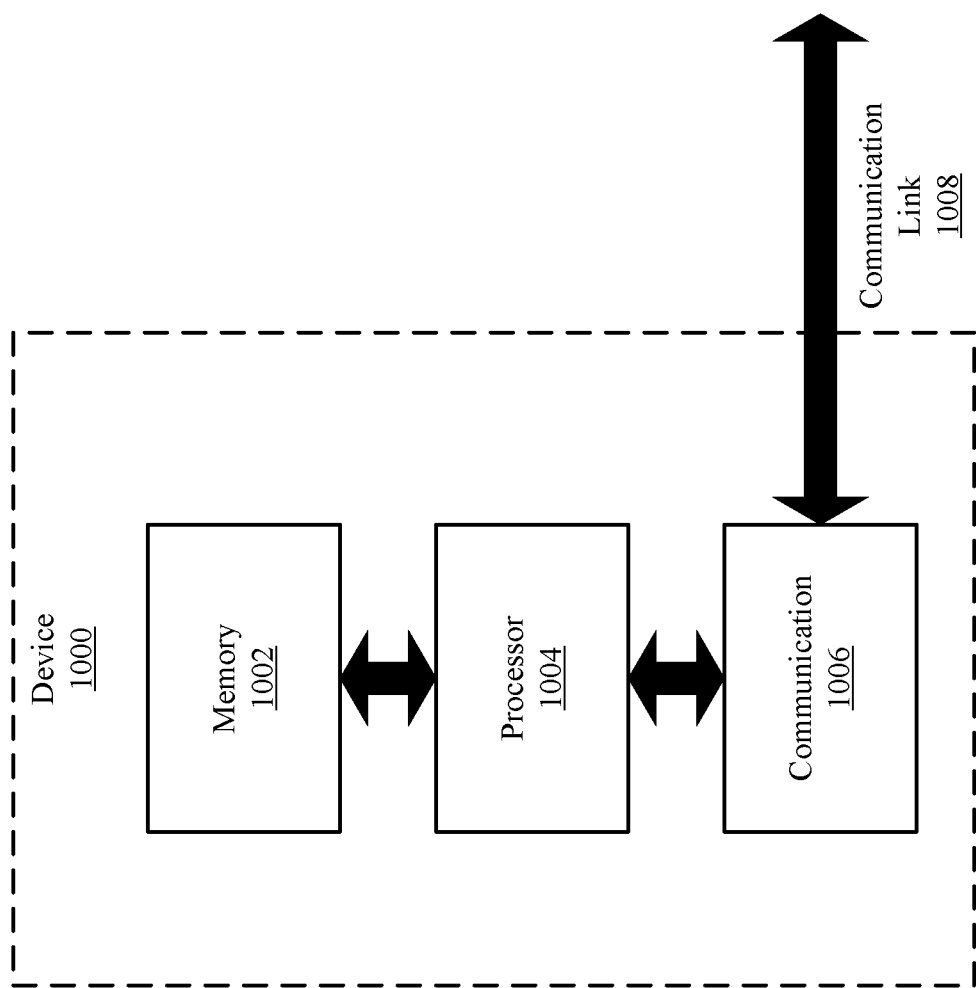
FIG. 10 illustrates a block diagram of a device that can be used to implement certain aspects of the disclosed technology.

FIG. 10 illustrates a block diagram of a device 1000 that can be used to implement certain aspects of the disclosed technology. For example, the device of FIG. 10 can be used to receive, process, store, provide for display and/or transmit various data and signals associated with disclosed image sensors that capture and process images, and/or microdisplays, and SLMs to enable control, display, storage and processing of the virtual content and the occlusion masks, as well as brightness control, light modulation or other operations associated with electronic and opto-electronic components disclosed herein. The device 1000 comprises at least one processor 1004 and/or controller, at least one memory 1002 unit that is in communication with the processor 1004, and at least one communication unit 1006 that enables the exchange of data and information, directly or indirectly, through the communication link 1008 with other entities, devices, databases and networks. The communication unit 1006 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 1000 of FIG. 10 may be integrated as part of larger component (e.g., a server, a computer, tablet, smart phone, etc.) that can be used for performing various computations, methods or algorithms disclosed herein.

The processor(s) 1004 may include central processing units (CPUs) to control the overall operation of, for example, the host computer. In certain embodiments, the processor(s) 1004 accomplish this by executing software or firmware stored in memory 1002. The processor(s) 1004 may be, or may include, one or more programmable general-purpose or special-purpose microprocessors, digital signal processors (DSPs), programmable controllers, application specific integrated circuits (ASICs), programmable logic devices (PLDs), graphics processing units (GPUs), or the like, or a combination of such devices.

The memory 1002 can be or can include the main memory of a computer system. The memory 1002 represents any suitable form of random access memory (RAM), read-only memory (ROM), flash memory, or the like, or a combination of such devices. In use, the memory 1002 may contain, among other things, a set of machine instructions which, when executed by processor 1004, causes the processor 1004 to perform operations to implement certain aspects of the presently disclosed technology.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. For example, the processor may be configured to receive electrical signals or information from the disclosed sensors (e.g., CMOS sensors), and to process the received information to produce images or other information of interest.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes Only a few implementations and examples are described and other implementations, enhancements and variations can be made based on what is described and illustrated in this patent document.

What is claimed is:

1. An occlusion-capable optical see-through head-mount display (OCOST-HMD), comprising:
   a polarization element configured to receive light from a real scene and to produce polarized light at the output thereof;
   a polarizing beam splitter (PBS);
   an objective lens;
   a spatial light modulator (SLM);
   an eyepiece lens;
   a quarter wave plate (QWP);
   a microdisplay; and
   a reflective optical element configured to reflect substantially all or a portion of light that is incident thereupon in a first direction, and to transit substantially all or a portion of light received from the microdisplay that is incident thereupon from a second direction, wherein
   the SLM and the objective lens form a first double-pass configuration that allows at least a portion of light that passes through the objective lens to be reflected from the SLM based on an occlusion mask that corresponds to a virtual image presented on the microdisplay and to propagate again through the objective lens, and
   the eyepiece lens and the reflective optical element form a second double-pass configuration that allows at least a portion of light that passes through the eyepiece lens to be reflected from the reflective optical element and to propagate again through the eyepiece lens.

2. The OCOST-HMD of claim 1, wherein:
   the PBS is positioned to receive the polarized light and reflect the polarized light towards the objective lens, and
   the PBS is positioned to receive, and transmit therethrough toward the eyepiece lens, light that is output from the first double-pass configuration, and to reflect light that the PBS receives from the second double-pass configuration, including light from the microdisplay, towards a position of a human eye.

3. The OCOST-HMD of claim 1, further comprising a first reflecting surface, wherein,
   the PBS is positioned to:
   receive the polarized light and transmit therethrough the polarized light towards the objective lens, receive, and reflect toward the eyepiece lens, light that is output from the first double-pass configuration,
   reflect light that the PBS receives from the second double-pass configuration, including light from the microdisplay, towards the first reflecting surface, and
   wherein the first reflecting surface is positioned to reflect light that is incident thereupon towards a position of a human eye.

4. The OCOST-HMD of claim 1, wherein the SLM is configured to modulate the light that is incident thereupon in an on-off modulation mode.

5. The OCOST-HMD of claim 1, wherein the occlusion mask is used to effectuate modulation of one or more regions of the SLM.

6. The OCOST-HMD of claim 1, wherein the reflective optical element is positioned on a surface of the microdisplay.

7. The OCOST-HMD of claim 1, wherein the microdisplay includes an organic light emitting diode (OLED) device.

8. The OCOST-HMD of claim 1, wherein the QWP is positioned between the eyepiece lens and the reflective optical element.

9. The OCOST-HMD of claim 1, wherein the QWP is positioned between the eyepiece lens and the PBS.

10. The OCOST-HMD of claim 1, wherein the SLM includes a liquid crystal on silicon (LCoS) device.

11. The OCOST-HMD of claim 1, wherein the OCOST-HMD is configured to produce an erect image without using a roof prism.

12. The OCOST-HMD of claim 1, wherein the OCOST-HMD provides a pupil-matched optical configuration that maps a user's pupil, or relayed pupil, back to the user's eye position to enable a correct view point disparity to be maintained.

13. The OCOST-HMD of claim 1, wherein the OCOST-HMD is configured to produce a field of view (FOV) that is not limited by the eyepiece lens in at least one direction.

14. The OCOST-HMD of claim 1, wherein the OCOST-HMD has a field of view (FOV) greater than 40 degrees diagonally and an optical performance that is greater than 20% modulation contrast over a full FOV.

15. The OCOST-HMD of claim 1, wherein the OCOST-HMD has a see-through field of view (FOV) of 90 degrees by 40 degrees with an angular resolution of 1.0 arc minutes.

16. The OCOST-HMD of claim 1, wherein a least a portion of the OCOST-HMD corresponds to a set of two afocal 4f relays that image an entrance pupil to a conjugate intermediate pupil location.

17. The OCOST-HMD of claim 1, wherein the OCOST-HMD forms a single-layer, double-pass, pupil matched OCOST-HMD.

18. The OCOST-HMD of claim 1, comprising one or both of the following:
   (a) an objective lens group that includes the objective lens, or
   (b) an eyepiece lens group that includes the eyepiece lens.

19. An occlusion-capable optical see-through head-mount display (OCOST-HMD), comprising:
   a polarizer to produce polarized light associated with a real scene;
   a beam splitter (PBS);
   an objective lens;
   a spatial light modulator (SLM);
   an eyepiece lens;
   a retarder;
   a microdisplay; and a half-mirror configured to reflect substantially all of light associated with an occlusion mask that is incident thereupon in a first direction, and to transit substantially all of light associated with a virtual scene that is incident thereupon from a second direction, wherein
the PBS is positioned to:
  receive and direct the polarized light toward the SLM,
  receive and direct the light associated with the virtual scene toward a position for viewing by a user's eye, and
  receive and direct the light associated with the occlusion mask toward the half mirror, wherein the occlusion mask corresponds to a virtual image presented on the microdisplay
the SLM is configured to modulate the light incident thereon in accordance with a two-dimensional shape of the occlusion mask, and
the OCOST-HMD is configured to produce an erect image, and the position of a user's pupil, or relayed pupil, is mapped to the position of the user's eye to enable a correct view point disparity to be maintained.

\* \* \* \* \*